US011356406B2

(12) United States Patent
Hovorka et al.

(10) Patent No.: US 11,356,406 B2
(45) Date of Patent: Jun. 7, 2022

(54) LINKING USERS TO VIEWED CONTENT IN DYNAMIC INTERNET PROTOCOL ADDRESS ENVIRONMENTS

(71) Applicant: Target Brands, Inc., Minneapolis, MN (US)

(72) Inventors: Evan Hovorka, Minneapolis, MN (US); Chad Weber, Minneapolis, MN (US); Samantha Beale, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 79 days.

(21) Appl. No.: 16/941,872

(22) Filed: Jul. 29, 2020

(65) Prior Publication Data

US 2021/0036982 A1 Feb. 4, 2021

Related U.S. Application Data

(60) Provisional application No. 62/879,820, filed on Jul. 29, 2019.

(51) Int. Cl.

| | |
|---|---|
| ***H04L 12/66*** | (2006.01) |
| ***H04L 61/5007*** | (2022.01) |
| ***H04W 8/26*** | (2009.01) |
| ***H04L 61/103*** | (2022.01) |
| ***H04L 61/4511*** | (2022.01) |

(52) U.S. Cl.
CPC ........ *H04L 61/2007* (2013.01); *H04L 61/103* (2013.01); *H04L 61/1511* (2013.01); *H04W 8/26* (2013.01)

(58) Field of Classification Search
CPC . H04L 61/2007; H04L 61/103; H04L 61/1511
USPC .......................................................... 370/352
See application file for complete search history.

(56) References Cited

U.S. PATENT DOCUMENTS

| | | | |
|---|---|---|---|
| 7,861,260 | B2 | 12/2010 | Shkedi |
| 7,996,521 | B2 | 8/2011 | Chamberlain et al. |
| 9,277,275 | B1 | 3/2016 | Arini |

(Continued)

FOREIGN PATENT DOCUMENTS

| | | | |
|---|---|---|---|
| WO | 03053056 | A1 | 6/2003 |

OTHER PUBLICATIONS

IAB, Advanced TV Targeting, Retrieved from the Internet: https://www.iab.com/wp-content/uploads/2018/02/TV-Targeting_08082018.pdf, 2 pages, Aug. 8, 2018.

*Primary Examiner* — Hee Soo Kim
(74) *Attorney, Agent, or Firm* — Theodore M. Magee; Westman, Champlin & Koehler, P.A.

(57) ABSTRACT

A computer-implemented method includes receiving an internet protocol address and an identifier for a display and storing the display's internet protocol address and the display's identifier in a viewing record. A device's internet protocol address and a user identifier are received for a request sent by the device to a server. The display's internet protocol address is determined to match the device's internet protocol address and in response the display's identifier is associated with the user identifier. A display identifier in a viewing record and the association between the display's identifier and the user identifier are then used to determine that content listed in the viewing record was viewed by a user represented by the user identifier.

20 Claims, 21 Drawing Sheets

(56) References Cited

U.S. PATENT DOCUMENTS

| | | | | |
|---|---|---|---|---|
| 9,838,755 | B1 | 12/2017 | Kodige et al. | |
| 10,085,073 | B2 | 9/2018 | Ray et al. | |
| 2011/0035278 | A1 | 2/2011 | Fordyce, III et al. | |
| 2012/0084801 | A1 | 4/2012 | Rowe et al. | |
| 2012/0084828 | A1* | 4/2012 | Rowe | H04N 21/812 725/110 |
| 2013/0019009 | A1 | 1/2013 | Tremblay et al. | |
| 2014/0324447 | A1 | 10/2014 | Dittus | |
| 2016/0104203 | A1 | 4/2016 | Roosenraad et al. | |
| 2018/0084308 | A1* | 3/2018 | Lopatecki | H04N 21/25883 |
| 2018/0144364 | A1* | 5/2018 | Sprecher | G06Q 30/0246 |
| 2019/0132625 | A1* | 5/2019 | Matsunaga | G06Q 30/0255 |
| 2020/0226639 | A1* | 7/2020 | Heffernan | G06Q 30/0201 |

* cited by examiner

TOTALS  TRENDS  NETWORK  DAYPART  GROUP  CONTENT  SHOW  PARENT NETWORK

FROM: 4/22/2020 TO 4/28/2020    COMPANY A — 1102

| EXTRAPOLATED METRICS | GUEST METRICS | SALES METRICS | | | |
|---|---|---|---|---|---|
| EXTRAPOLATED METRICS BY CONTENT | | | | | |
| CONTENT | IMPRESSIONS | AIRINGS | IMPRESSIONS PER AIRING | ESTIMATED SPEND | ESTIMATED CPM |
| CONTENT A | 66,206,853 | 236 | 280,537,513 | $337,190 | $5.09 |
| CONTENT B | 56,146,140 | 417 | 134,643,022 | $659,375 | $11.74 |
| CONTENT C | 50,868,288 | 209 | 243,388,938 | $317,331 | $6.24 |
| CONTENT D | 45,878,691 | 190 | 241,466,795 | $271,526 | $5.92 |
| CONTENT E | 23,953,791 | 85 | 281,809,306 | $470,845 | $19.66 |
| CONTENT F | 17,345,230 | 113 | 153,497,611 | $191,172 | $11.02 |
| CONTENT G | 12,820,001 | 28 | 457,857,179 | $56,025 | $4.37 |
| CONTENT H | 3,966,902 | 19 | 208,784,316 | $78,976 | $19.91 |
| CONTENT I | 3,135,534 | 42 | 74,655,571 | $5,248 | $1.67 |
| CONTENT J | 567,875 | 3 | 189,291,667 | $14,036 | $24.72 |

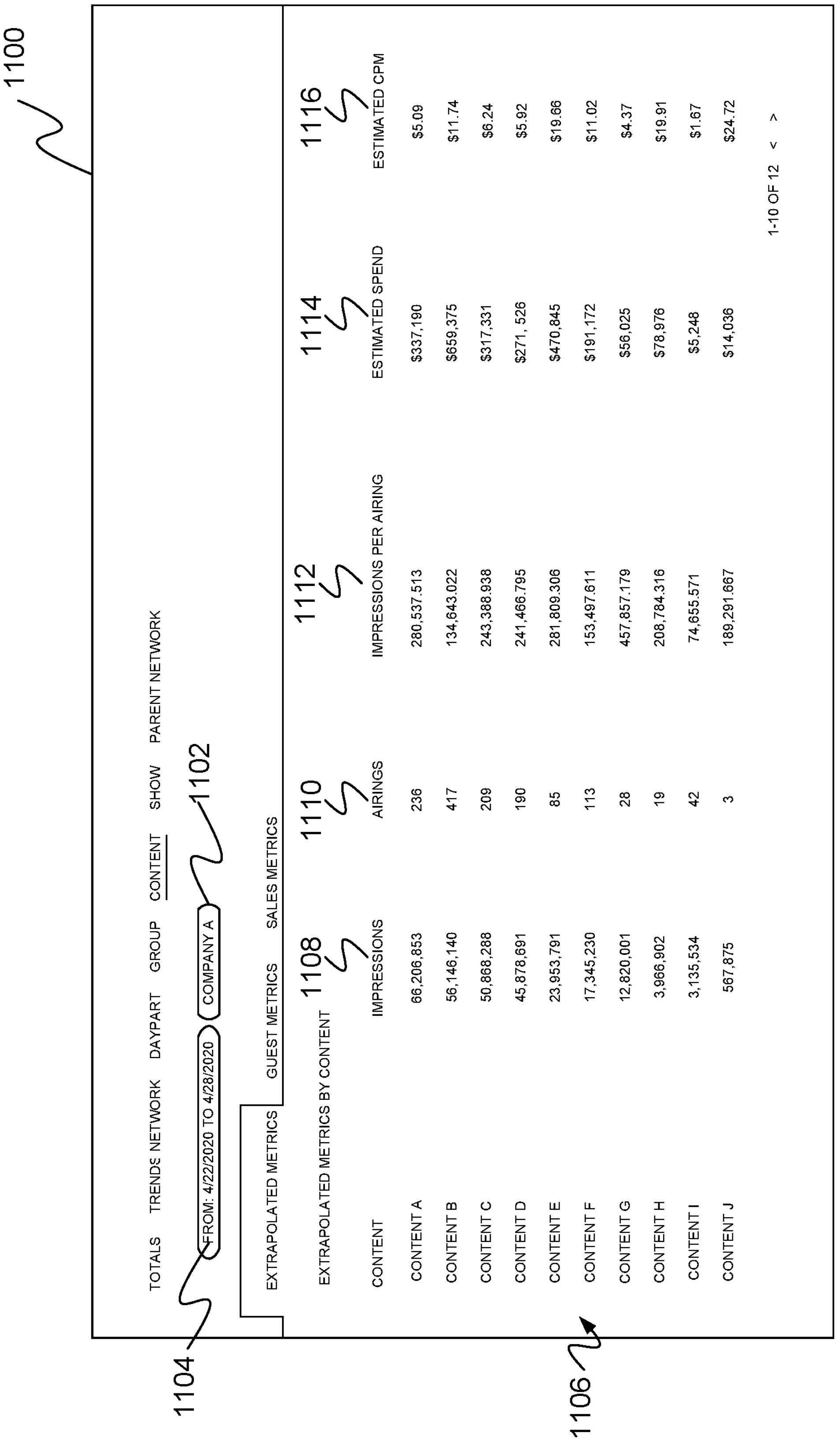

FIG. 11

TOTALS   TRENDS   NETWORK   DAYPART   GROUP   CONTENT   SHOW   PARENT NETWORK

FROM: 4/22/2020 TO 4/28/2020    COMPANY A    — 1102

EXTRAPOLATED METRICS   GUEST METRICS   SALES METRICS

EXTRAPOLATED METRICS BY DAYPART

| DAYPART | IMPRESSIONS | AIRINGS | IMPRESSIONS PER AIRING | ESTIMATED SPEND | ESTIMATED CPM |
|---|---|---|---|---|---|
| PRIMETIME | 75,135,695 | 226 | 332,458.827 | $870,771 | $11.59 |
| DAY TIME | 58,168,438 | 317 | 183,496.65 | $278,677 | $4.79 |
| WEEKEND AFTERNOON | 43,599,385 | 146 | 298,625.925 | $331,109 | $7.59 |
| LATE FRINGE AM | 23,447,825 | 114 | 205,682.675 | $334,796 | $14.28 |
| EARLY FRINGE | 22,235,989 | 153 | 145,333.261 | $206,825 | $9.30 |
| WEEKEND DAY | 21,407,134 | 110 | 194,610.309 | $105,913 | $4.95 |
| EARLY MORNING | 17,564,942 | 160 | 109,780.888 | $147,619 | $8.40 |
| LATE FRINGE PM | 13,030,202 | 69 | 188,843.507 | $122,711 | $9.42 |
| OVER NIGHT | 6,921,703 | 74 | 93,536.527 | $23,020 | $3.33 |

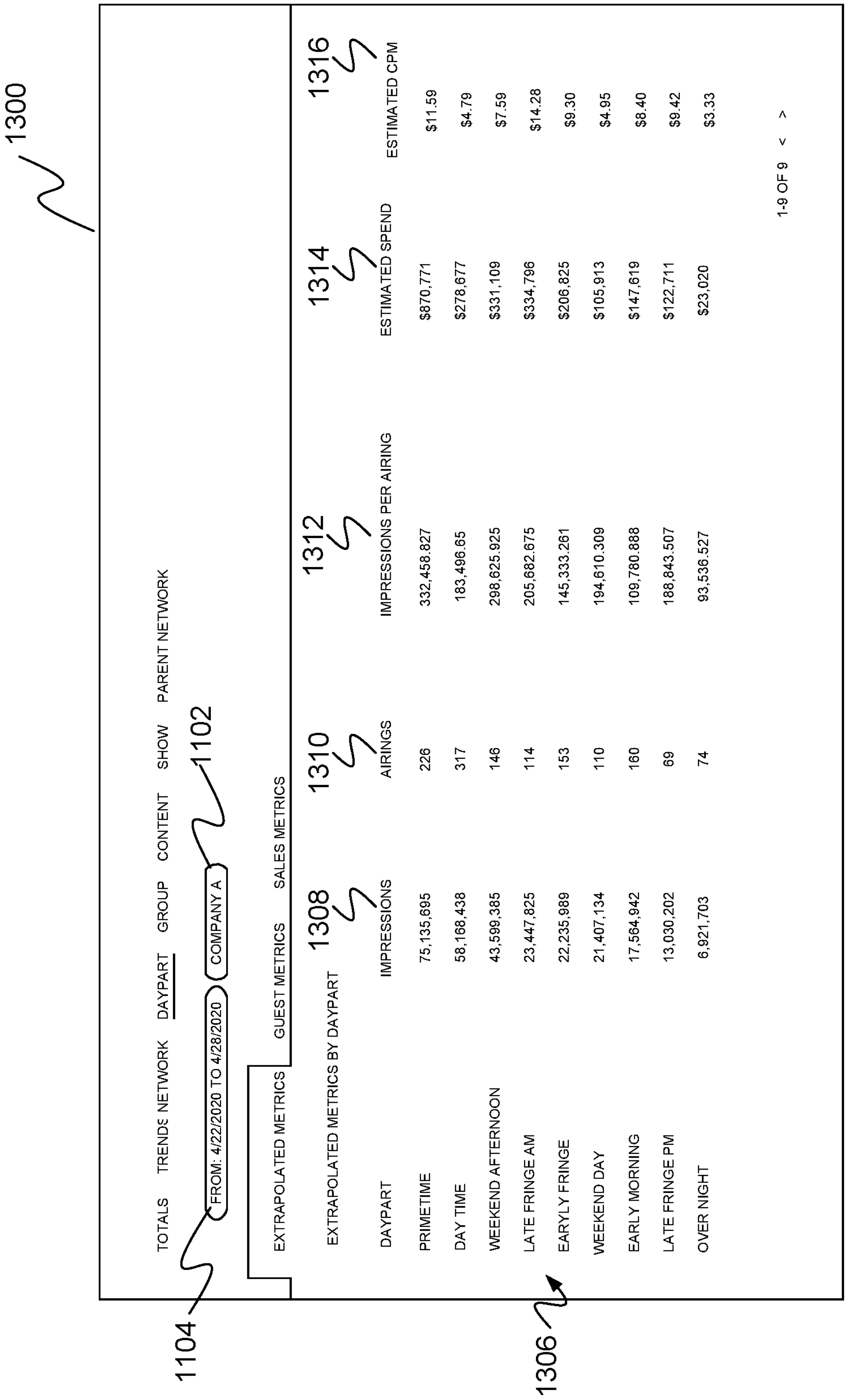

FIG. 13

TOTALS  TRENDS  NETWORK  DAYPART  GROUP  CONTENT  SHOW  PARENT NETWORK

FROM: 4/22/2020 TO 4/28/2020   COMPANY A — 1102

| EXTRAPOLATED METRICS | GUEST METRICS | SALES METRICS |

EXTRAPOLATED METRICS BY SHOW

| SHOW | IMPRESSIONS | AIRINGS | IMPRESSIONS PER AIRING | ESTIMATED SPEND | ESTIMATED CPM |
|---|---|---|---|---|---|
| SHOW A | 21,030,699 | 36 | 584,186.083 | $79,626 | $3.79 |
| SHOW B | 12,743,792 | 8 | 1,592,974 | $13,736 | $1.08 |
| SHOW C | 8,220,438 | 6 | 1,370,073 | $40,332 | $4.91 |
| SHOW D | 7,406,990 | 17 | 435,705.294 | $49,633 | $6.70 |
| SHOW E | 6,955,535 | 16 | 434,720.938 | $25,660 | $3.69 |
| SHOW F | 6,252,057 | 15 | 416,803.8 | $92,111 | $14.73 |
| SHOW G | 5,985,485 | 2 | 2,992,742.5 | $84,388 | $14.10 |
| SHOW H | 5,265,610 | 6 | 877,601.667 | $11,619 | $2.21 |
| SHOW I | 5,105,128 | 14 | 364,652 | $9,692 | $1.90 |
| SHOW J | 4,778,200 | 6 | 796,366.667 | $13,626 | $2.78 |

TOTALS   TRENDS NETWORK   DAYPART   GROUP   CONTENT   SHOW   PARENT NETWORK

FROM: 4/22/2020 TO 4/28/2020   COMPANY A

| EXTRAPOLATED METRICS | GUEST METRICS | SALES METRICS | | | |
|---|---|---|---|---|---|
| EXTRAPOLATED METRICS BY NETWORK | | | | | |
| NETWORK | IMPRESSIONS | AIRINGS | IMPRESSIONS PER AIRING | ESTIMATED SPEND | ESTIMATED CPM |
| NETWORK A | 47,039,689 | 94 | 500,422.223 | $172,420 | $3.67 |
| NETWORK B | 20,265,568 | 33 | 614,108.121 | $75,542 | $3.73 |
| NETWORK C | 15,551,475 | 322 | 48,296.506 | $113,483 | $7.30 |
| NETWORK D | 13,765,726 | 8 | 1,720,715.75 | $360,597 | $26.20 |
| NETWORK E | 13,206,013 | 10 | 1,320,601.3 | $17,203 | $1.30 |
| NETWORK F | 12,305,141 | 20 | 619,757.05 | $124,238 | $10.02 |
| NETWORK G | 12,186,547 | 6 | 2,031,091.167 | $138,940 | $11.40 |
| NETWORK H | 11,988,025 | 14 | 856,287.5 | $94,880 | $7.91 |
| NETWORK I | 11,100,978 | 11 | 1,009,179.818 | $100,901 | $9.09 |
| NETWORK J | 10,476,456 | 56 | 187,079.571 | $23,515 | $2.24 |

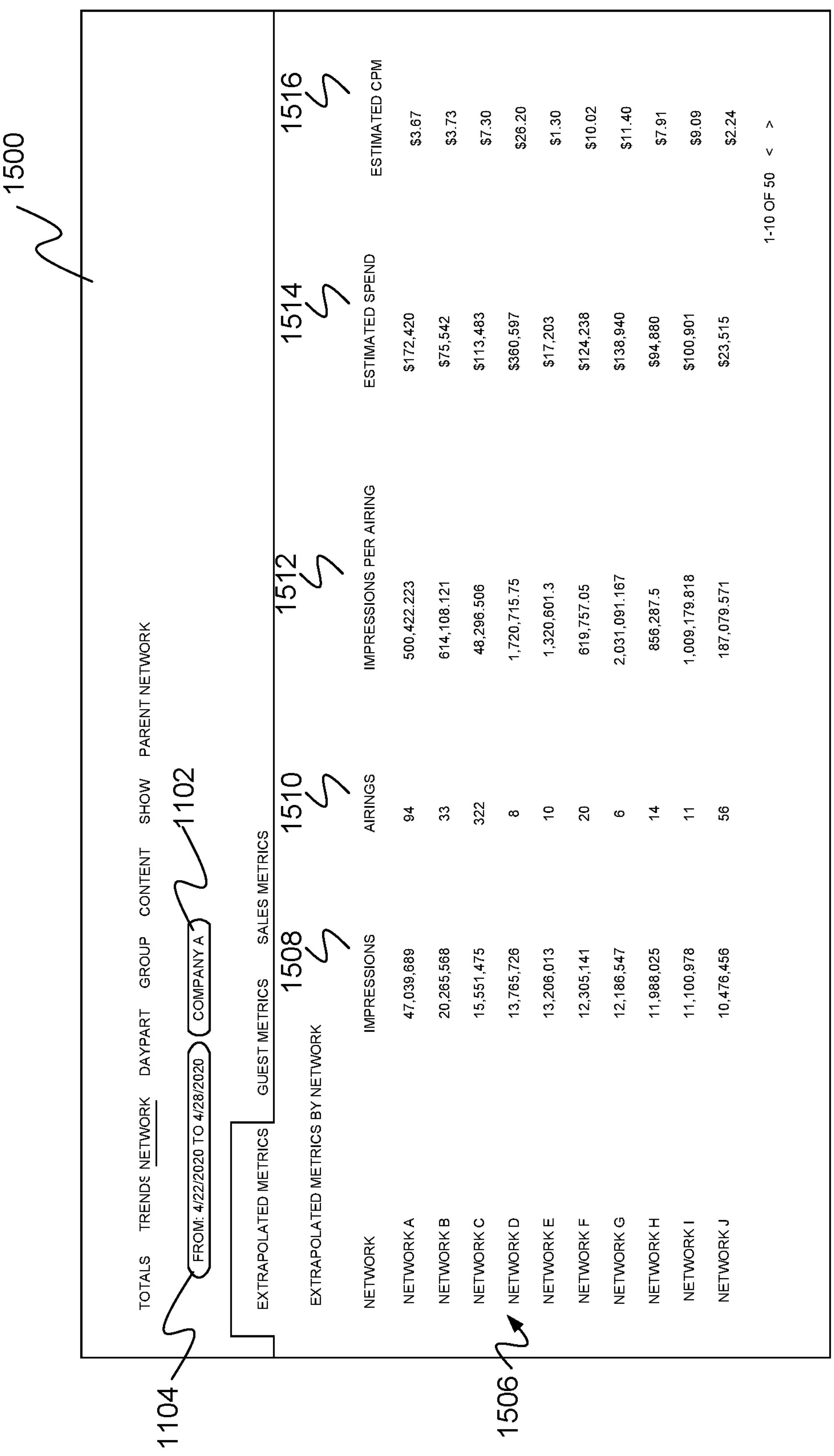

FIG. 15

| NETWORK | GUEST IMPRESSIONS | UNIQUE GUESTS | GUEST IMPRESSION FREQ. | HOUSEHOLD IMPRESSIONS | UNIQUE HOUSEHOLDS |
|---|---|---|---|---|---|
| NETWORK A | 672,890 | 187,274 | 3.593 | 390,062 | 108,576 |
| NETWORK B | 247,369 | 65,835 | 3.757 | 145,147 | 39,144 |
| NETWORK C | 187,366 | 138,591 | 1.352 | 111,740 | 82,094 |
| NETWORK D | 183,556 | 24,353 | 7.537 | 106,576 | 14,038 |
| NETWORK E | 173,962 | 101,356 | 1.716 | 100,944 | 55,439 |
| NETWORK F | 150,631 | 64,101 | 2.35 | 92,326 | 39,595 |
| NETWORK G | 144,617 | 100,757 | 1.435 | 83,272 | 56,593 |
| NETWORK H | 137,352 | 102,567 | 1.339 | 81,131 | 58,232 |
| NETWORK I | 128,708 | 47,923 | 2.686 | 74,903 | 29,417 |
| NETWORK J | 114,399 | 76,899 | 1.488 | 67,023 | 43,927 |

TOTALS  TRENDS NETWORK  DAYPART  GROUP  CONTENT  SHOW  PARENT NETWORK

FROM: 4/22/2020 TO 4/28/2020  COMPANY A — 1102

EXTRAPOLATED METRICS  GUEST METRICS  SALES METRICS

SALES METRICS BY NETWORK

| NETWORK | SALES | TRANSACTIONS | UNIQUE GUESTS | TRANSACTION FREQ. | SALES PER CONVERTED | SPII | CONV. RATE |
|---|---|---|---|---|---|---|---|
| NETWORK A | $1,608,600 | 28,412 | 14,524 | 1.956 | $110.75 | $4,123 | 7.76% |
| NETWORK B | $1,251,977 | 21,795 | 10,949 | 1.991 | $114.35 | $11,204 | 7.9% |
| NETWORK C | $958,516 | 16,686 | 8,812 | 1.894 | $108.77 | $9,495 | 8.69% |
| NETWORK D | $875,985 | 15,548 | 7,730 | 2.011 | $113.32 | $10,797 | 7.54% |
| NETWORK E | $865,383 | 15,117 | 7,946 | 1.902 | $108.91 | $10,392 | 7.89% |
| NETWORK F | $708,969 | 12,144 | 6,415 | 1.893 | $110.52 | $10,578 | 8.34% |
| NETWORK G | $565,151 | 10,081 | 4,924 | 2.047 | $114.77 | $9,504 | 9.82% |
| NETWORK H | $410,490 | 6,826 | 3,499 | 1.951 | $117.32 | $7,774 | 9.15% |
| NETWORK I | $395,729 | 7,254 | 3,907 | 1.857 | $101.29 | $2,726 | 5.93% |
| NETWORK J | $360,209 | 6,239 | 3,299 | 1.891 | $109.19 | $8,278 | 8.09% |

1-10 OF 29  <  >

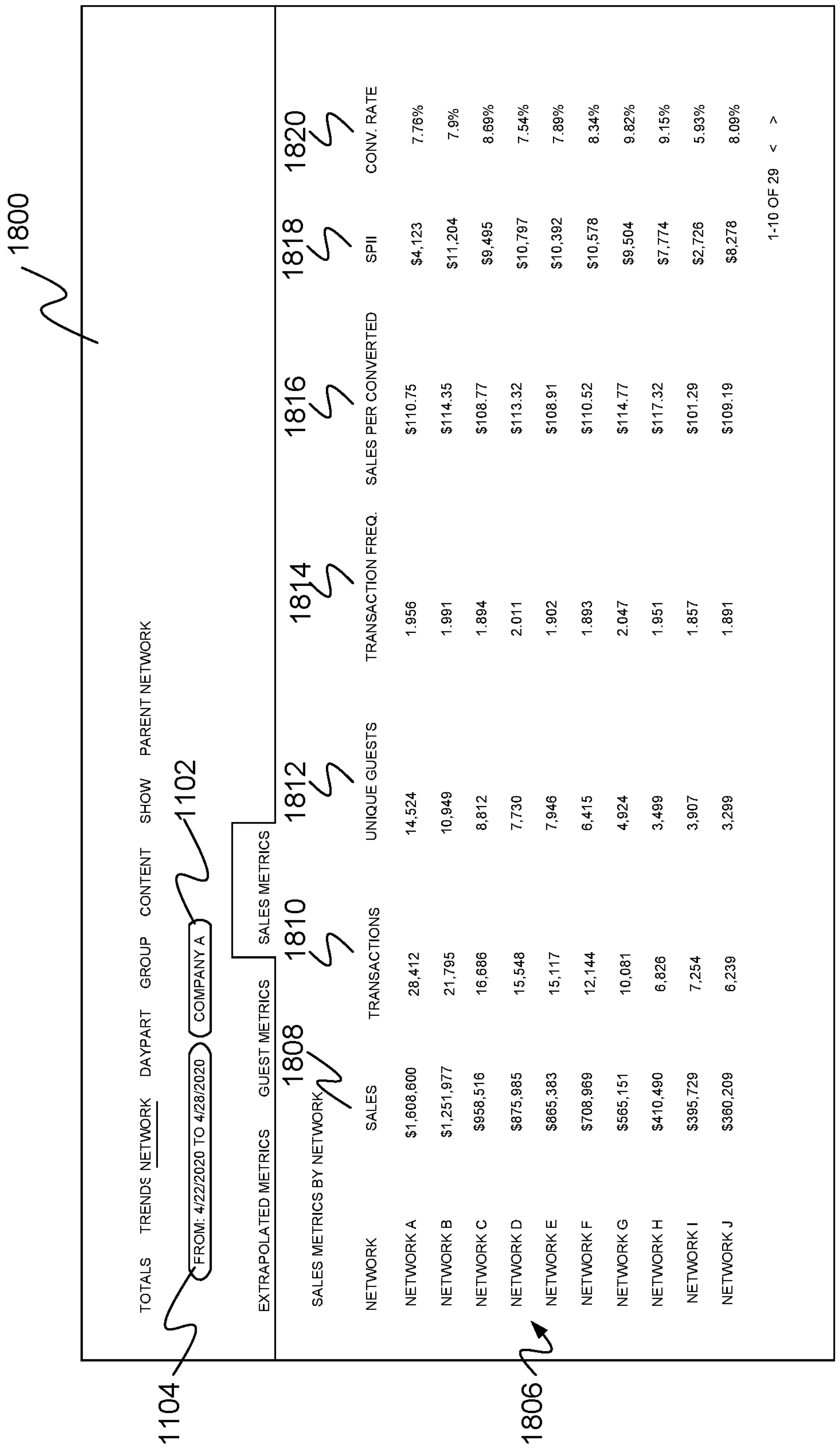

FIG. 18

LINKING USERS TO VIEWED CONTENT IN DYNAMIC INTERNET PROTOCOL ADDRESS ENVIRONMENTS

CROSS-REFERENCE TO RELATED APPLICATION

The present application is based on and claims the benefit of U.S. provisional patent application Ser. No. 62/879,820, filed Jul. 29, 2019 the content of which is hereby incorporated by reference in its entirety.

BACKGROUND

The internet consists of millions of devices that are connected together by a constellation of routers tasked with routing messages between the devices. When a source device wants to send a message to a destination device, it generates one or more message packets that each include an identifier for the destination device known as an Internet Protocol (IP) address. When a router receives a packet, it examines the IP address for the destination device and then forwards the packet along a path that is connected to that IP address.

For security reasons and to limit the number of IP addresses that are used across the internet, devices that are part of a common local area network are represented by a single IP address, which is typically the public IP address of a local area network router. Because all of the devices in the local area network have the same public IP address, a port number is added to the message packets to indicate which device in the local area network should receive the message packets.

Each local area network router assigns an internal IP address to each device in the local area network. This internal or private IP address is only used to route messages within the local area network and for security reasons is not shared outside of the local area network. When a message is transmitted between the local area network and the internet, the router performs a translation from the external port number to the internal IP address.

The public IP address assigned to the local area network router can either be static or dynamic. A static public IP address does not change over time whereas a dynamic public IP address typically changes each time the router reconnects to the internet and at periodic intervals determined by the internet service provider that provides the internet connection to the router.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving an internet protocol address and an identifier for a display and storing the display's internet protocol address and the display's identifier in a viewing record. A device's internet protocol address and a user identifier are received for a request sent by the device to a server. The display's internet protocol address is determined to match the device's internet protocol address and in response the display's identifier is associated with the user identifier. A display identifier in a viewing record and the association between the display's identifier and the user identifier are then used to determine that content listed in the viewing record was viewed by a user represented by the user identifier.

In accordance with a further embodiment, a computer server includes a memory containing instructions and a processor executing the instructions to perform steps that include receiving a display identifier for a display used to view content, the display identifier being distinct from an internet protocol address and searching a database to locate a user identifier for the display identifier. The user identifier is then associated with the content.

In accordance with a still further embodiment, a method includes linking a user identifier to a display identifier using a dynamic internet protocol address, wherein neither the user identifier nor the display identifier are internet protocol addresses. The display identifier is used to determine that the selected content was viewed on the display and the linking of the user identifier to the display identifier is used to determine that a user associated with the user identifier viewed the selected content. A measure of how many users viewed the selected content is displayed based in part on the determination that the user associated with the user identifier viewed the selected content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 11 is an example of a user interface showing extrapolated metrics for content.

FIG. 13 is an example of a user interface showing extrapolated metrics for dayparts.

FIG. 15 is an example of a user interface showing extrapolated metrics for networks.

FIG. 18 is an example of a user interface showing sales metrics for networks.

DETAILED DESCRIPTION

In the past, attempts have been made to link information received from one device in a local area network to information received from another device in the same local area network by using the public IP address of the router of the local area network. In particular, because the two devices share the same router, messages sent from the devices will include the same public IP address when the internet service provider assigns a single IP address to the router. Such techniques, however, have limited effectiveness in environments where internet service providers provide dynamic public IP addresses to routers. In such environments, changes to the public IP address of a router can cause data associated with a device in the local area network to be associated with a device in a different local area network that has recently received the old public IP address of the router. Similarly, if the two devices in the local area network provide data at different times, new data associated with a new public IP address for the router may not be matched to the other device in the local area network, which continues to be associated with the old public IP address of the router. For example, if one device interacts with the server on a weekly basis while the other device interacts with the server on a minute-by-minute basis, a great deal of data produced by the minute-by-minute device may not be associated with the weekly device.

Embodiments described below are able to link a user identifier associated with one device in a local area network to content viewed on a second device in the local area network when a router for the local area network has been assigned a dynamic public IP address. For example, a user identifier stored in a laptop computer can be linked to content viewed on a smart TV when both the laptop and the smart TV are part of the same home network.

This linking is accomplished by matching the dynamic IP address found in messages sent by the device to the dynamic IP address found in messages sent by the display during a common time period. By ensuring that the messages were sent within some threshold time of each other, the embodiments make it more likely that the dynamic IP address was assigned to the same router when both messages were sent. Once the messages are linked by their common dynamic IP address, a display identifier in the messages from the display can be linked to the user identifier stored on the laptop. Future messages from the display are then matched to the user identifier without matching the dynamic IP address of the router. In particular, the display identifier is used to search user records for a user ID that has been previously associated with the display identifier. This allows the user ID to then be associated with the content of the message from the display. As a result, even when the router's dynamic IP address changes, the user ID will continue to be associated with the messages from the display.

Figure 1:
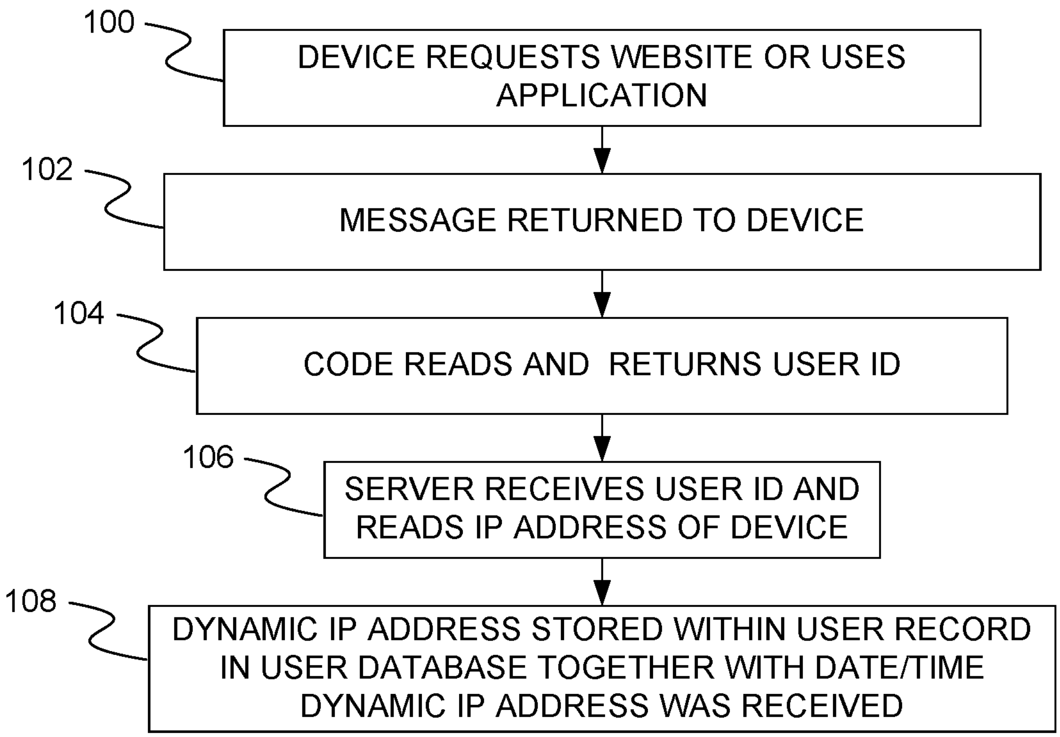
FIG. 1 is a flow diagram of a method of associating an IP address with a user identifier in accordance with one embodiment.
Figure 2:
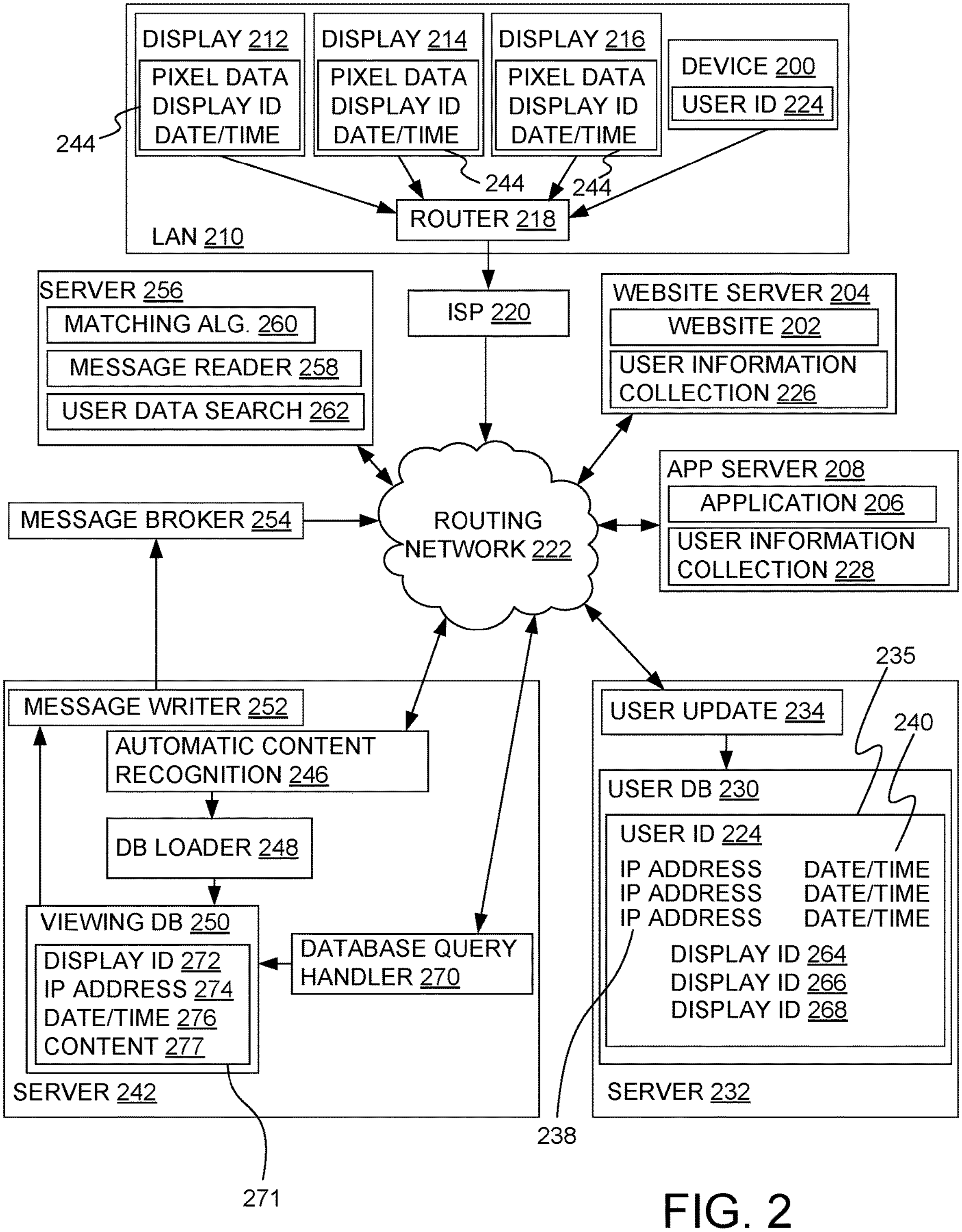
FIG. 2 is a block diagram of elements used to assign IP addresses to user identifiers and display identifiers in accordance with one embodiment.

FIG. 1 provides a flow diagram of a method of associating a user identifier with a dynamic IP address of a router. FIG. 2 shows a block diagram of elements used in the method of FIG. 1. At step 100 of FIG. 1, device 200 requests a page of a website 202 on a website server 204 or makes a request of an application 206 on an application server 208. Device 200 is part of a local area network (LAN) 210, such as a home network, that includes at least one display device/smart TV, such as displays 212, 214 and 216 and a local area network (LAN) router 218 that routes messages between device 200 and displays 212, 214 and 216. Router 218 also routes messages to and from LAN 210 and the internet through an internet service provider (ISP) router 220 that is connected to a routing network 222 of the internet. ISP router 220 assigns a dynamic IP address to LAN router 218 when LAN router 218 initially connects to ISP router 220 and on a periodic basis as determined by the internet service provider.

The request from device 200 for the page of website 202 or for application 206 is sent within a message that includes a header providing the dynamic IP address of LAN router 218. As such, when the request is received by website server 204 or application server 208, the dynamic IP address of LAN router 218 is available to website server 204/application server 208.

After receiving the request, website server 204 or application server 208 sends a return message to the device at step 102. Code within device 200, such as code previously loaded on device 200 or code embedded in the message returned by website server 204 or application server 208, reads a user ID 224 stored on device 200 and sends the stored user ID 224 to website server 204 or application server 208 at step 104. The user ID 224 is sent in a message that travels from device 200 to LAN router 218. In LAN router 218, a header of the message is changed to replace the internal IP address of device 200 with the dynamic IP address of LAN router 218. The message with the modified header is then sent through ISP router 220 and routing network 222 to website server 204 or application server 208.

At step 106, website server 204 or application server 208 receives the message containing user ID 224 and the header that identifies the dynamic IP address of LAN router 218. At step 108, a user-information collection module 226 in website server 204 or a user-information collection module 228 in application server 208 parses user ID 224 and the dynamic IP address of LAN router 218 from the message and uses user ID 224 to store the dynamic IP address as dynamic IP address 238 in a user record 235 of a user database 230. In accordance with one embodiment, user database 230 is stored on a server 232 and the dynamic IP address is stored by making a call to a user update module 234 on server 232. In addition to storing dynamic IP address 238, update module 234 also stores a date/time value 240 to indicate the date and time that the message containing the user ID and dynamic IP address was received by website server 204 or application server 208.

Figure 3:
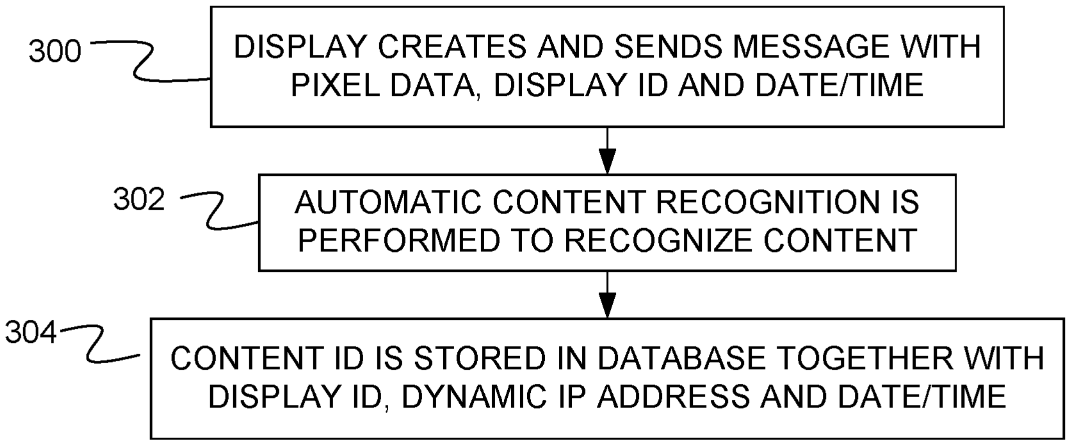
FIG. 3 is a flow diagram of a method of collecting viewing data from a display.

Each of the displays 212, 214 and 216 in LAN 210, has a respective display identifier that uniquely identifies the display. FIG. 3 provides a flow diagram of a method of collecting these display identifiers together with a dynamic IP address of router 218.

In step 300 of FIG. 3, a display, such as one of displays 212, 214 and 216 creates a message 244 containing pixel data, the display identifier of the display, and a date/time associated with the pixel data. The pixel data represents the values of a collection of pixels currently being shown on the display. The pixel data can represent all of the pixels in a single frame of the display, a subset of the pixels in a single frame of the display, all of the pixels from multiple frames shown on the display, or a subset of the pixels from multiple frames shown on the display. Once created, message 244 is transmitted through LAN router 218 to ISP router 220 and then through routing network 222 to a server 242. When sending message 244, LAN router 218 inserts its dynamic IP address into the message header such that server 242 receives the dynamic IP address when it receives message 244.

At step 302, an automatic content recognition application 246 in server 242 processes the pixel data in the message to identify content represented by the pixel data, such as television shows, movies, sporting events and advertisements, for example. At step 304, automatic content recognition application 246 provides an identifier for the recognized content, the display identifier, the dynamic IP address and the date/time of message 244 to a database loader 248, which loads the information into a viewing database 250 producing a viewing record 271 that includes display identifier 272, dynamic IP address 274, date/time 276 and content identifier 277.

Figure 4:
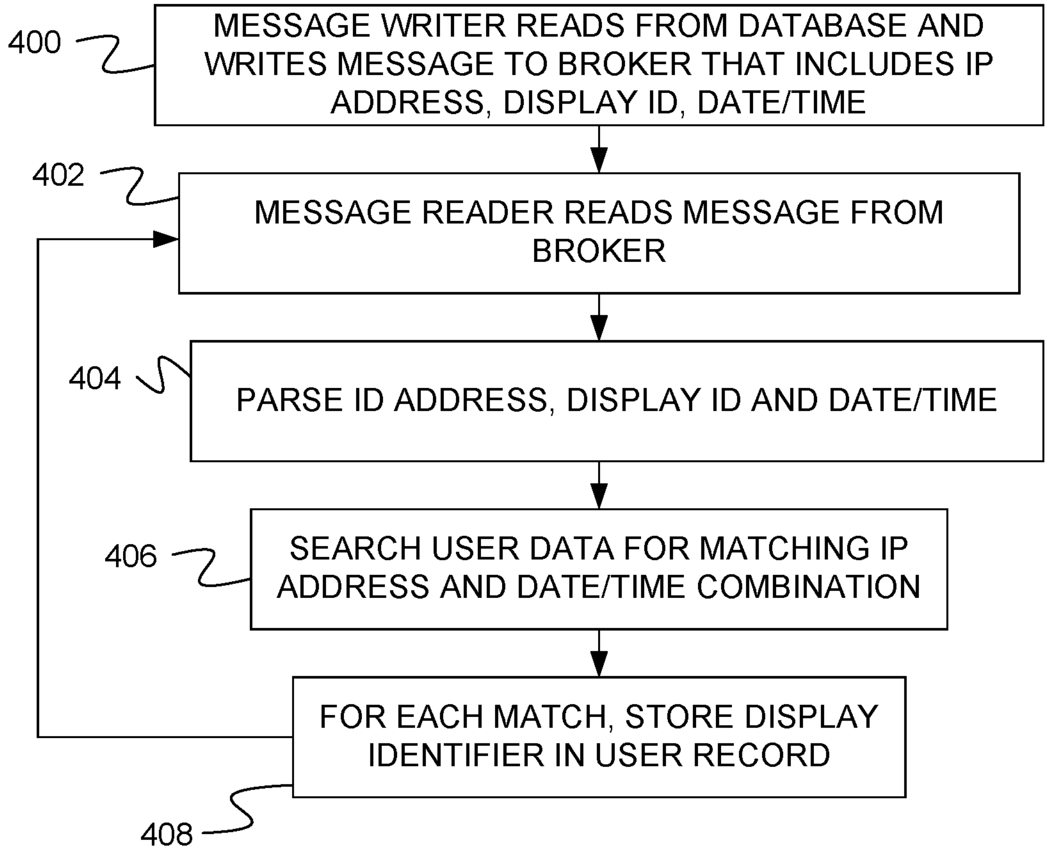
FIG. 4 is a flow diagram of a method of associating a display identifier with a user identifier using a push model.

In accordance with one embodiment, a push model is used to associate display identifiers with user IDs. FIG. 4 provides a flow diagram of a method utilizing this push model.

In step 400, a message writer 252 of server 242 retrieves the dynamic IP address, display identifier and date and time of a viewing record 271 in viewing database 250. In accordance with one embodiment, message writer 252 marks each viewing record 271 it uses so that each record is only used once to link a display identifier to a user ID. Message writer 252 then writes a message containing the dynamic IP address, the display identifier and the date and time and sends the message to a message broker 254. Message broker 254 may be located on server 242 or on a separate server.

At step 402, a message reader 258 in a server 256 requests a message from message broker 254. In accordance with one embodiment, message broker 254 maintains a topic of messages written by message writer 252 that message reader 258 is able to specify when making a request for messages from message broker 254. At step 404, message reader 258 passes the message to a matching algorithm 260, which parses the dynamic IP address, the display identifier and the date and time from the message. Matching algorithm 260 then launches a user data search 262 to search user database 230 for each user record that matches the dynamic IP address and date/time combination at step 406. In accordance with one embodiment, the search involves searching for an exact match of the dynamic IP address without reference to any port numbers in the dynamic IP address and for a date/time value that is within a window centered about the data/time value in the viewing record 271. In accordance with one embodiment, the window is 24 hours long with 12 hours before the pixel data message and 12 hours after the pixel data message.

If the search finds a user record 235 with a dynamic IP address 238 and date/time 240 that meet the searching criteria, the user ID 224 of user record 235 is returned to matching algorithm 260. Note that since multiple users can use the same LAN router 218 and each have their own unique user ID 224, it is possible for multiple user records 235 to be returned in the search at step 406. For each matching user record, matching algorithm 260 writes the display identifier parsed at step 404 to the user record 235 creating a display ID entry at step 408. As shown in FIG. 2, each user record 235 can include multiple display IDs, such as display IDs 264, 266 and 268 since there can be multiple displays attached to LAN router 218.

When all the matching user records have had the display identifier written to their record at step 408, the process returns to step 402 where message reader 258 retrieves a next message from message broker 254.

Figure 5:
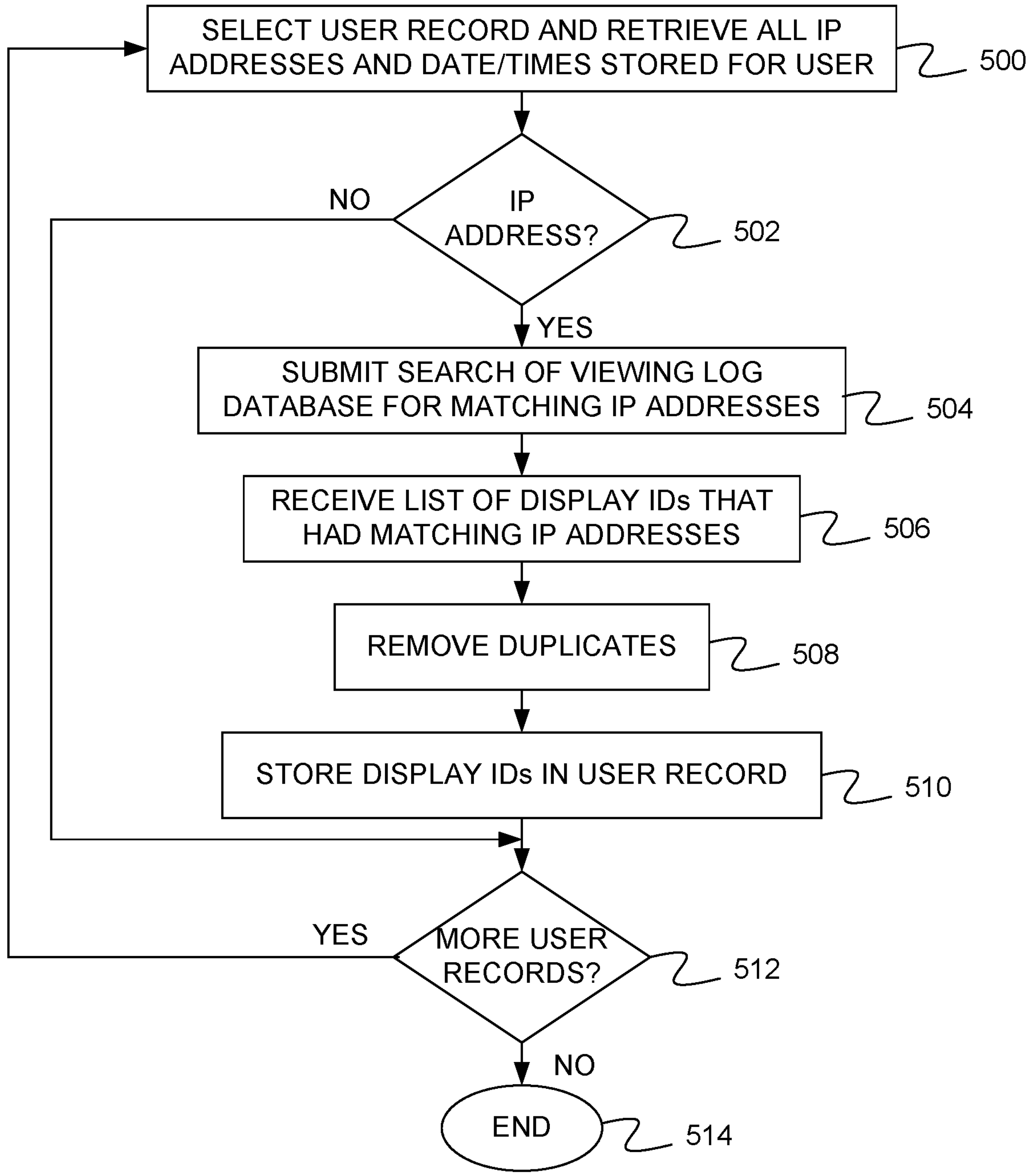
FIG. 5 is a flow diagram of a method of associating a display identifier with a user identifier using a pull model.

In an alternative embodiment, instead of using a push model for associating the user identifier with one or more display identifiers, a pull model is used. FIG. 5 provides a flow diagram of a method of implementing such a pull model.

At step 500, matching algorithm 260 uses user data search 262 to retrieve a user record 235 including the user ID 224 and all dynamic IP addresses 238 and their respective date/times 240 that have been stored for the user ID. At step 502, matching algorithm 260 determines if there is at least one dynamic IP address 238 in the returned user record 235. If at least one dynamic IP address is in the user record, each of the dynamic IP addresses is used in a respective separate search of viewing database 250 at step 504. For each search, a request is sent to database query handler 270 of server 242 to retrieve all viewing records in viewing database 250 that have a dynamic IP address 274 that matches the dynamic IP address 238 retrieved at step 500 and a date/time value 276 that is within a window centered about date/time value 240 retrieved at step 500. In accordance with one embodiment, the date/time window includes dates and times that are 12 hours before and dates and times that are 12 hours after the date/time 240 from user record 235. In accordance with one embodiment, matching a dynamic IP address involves matching the entire IP address except for any port number that has been appended to the dynamic IP address.

Based on the search, database query handler 270 returns the display identifier 272 for each viewing record 271 that matches the dynamic IP address and date/time requirements. This list of display identifiers is received by matching algorithm 260 at step 506. At step 508, matching algorithm 260 removes any duplicate display IDs if not already removed by database query handler 270. At step 510, matching algorithm 260 uses user update module 234 on server 232 to store the non-duplicate display identifiers in the user record 235 selected at step 500. For example, display identifier entries 264, 266 and 268 can be added to user record 235 at step 510. Note that multiple display identifiers can be stored in record 235 during step 510 since multiple displays can be connected to LAN router 218.

If the user record 235 does not include a dynamic IP address 238 at step 502 or after step 510, matching algorithm 260 determines if there are more user records in user database 230 at step 512. If there are more user records, matching algorithm 260 returns to step 500 to select a new user record. When all of the user records have been processed at step 512, the process ends at step 514 or the process can begin again from the beginning of user database 230, which is constantly being updated.

Figure 6:
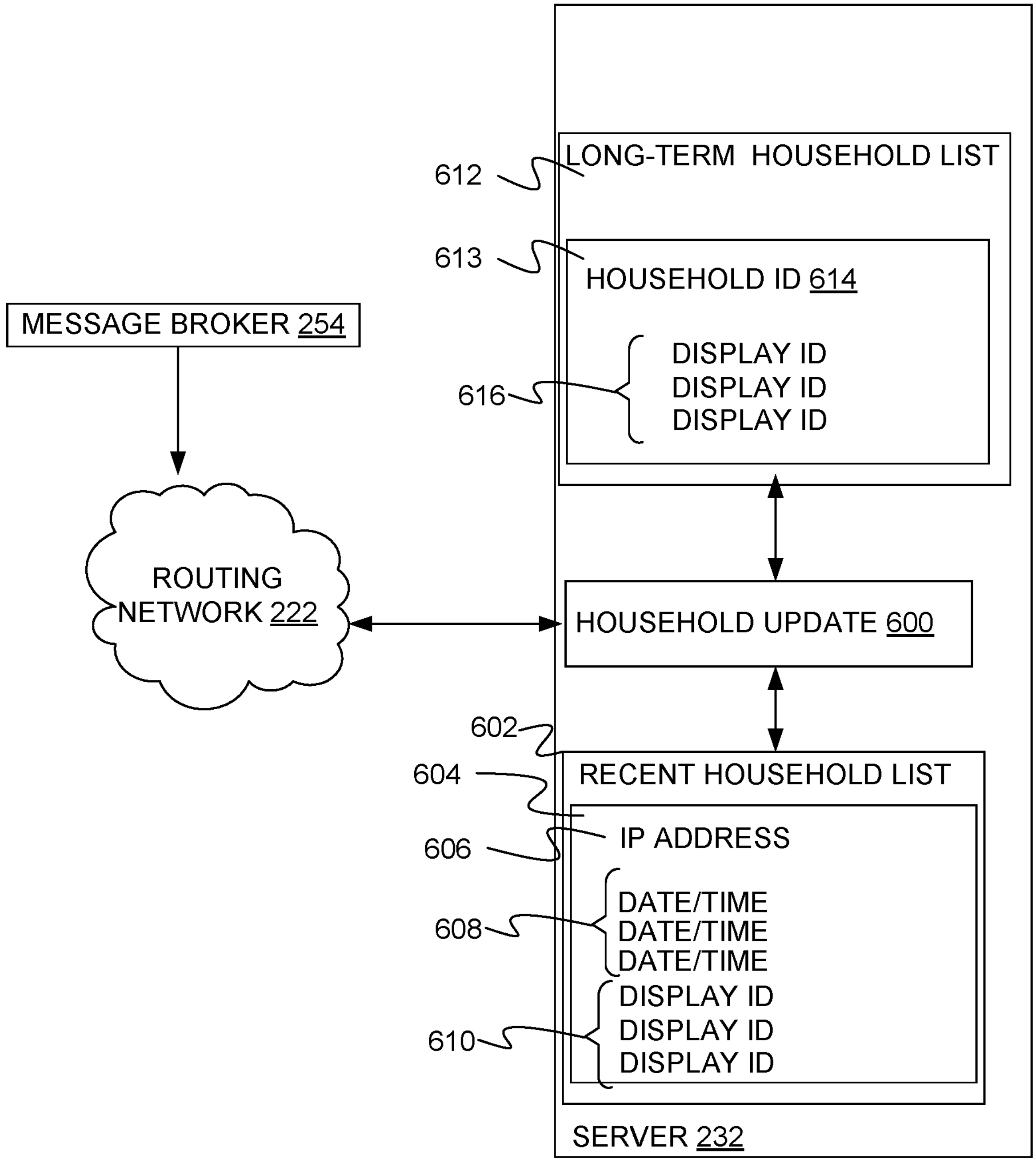
FIG. 6 is a block diagram of elements used to produce a display list for each of a plurality of households.

In accordance with one embodiment, the messages held by message broker 254 are also used to group displays into "households". In this context, a household consists of displays that use a same IP address during one or more limited time periods. FIG. 6 provides a block diagram of a system for grouping displays into households and FIGS. 7 and 8 provide methods for forming and updating households.

Figure 7:
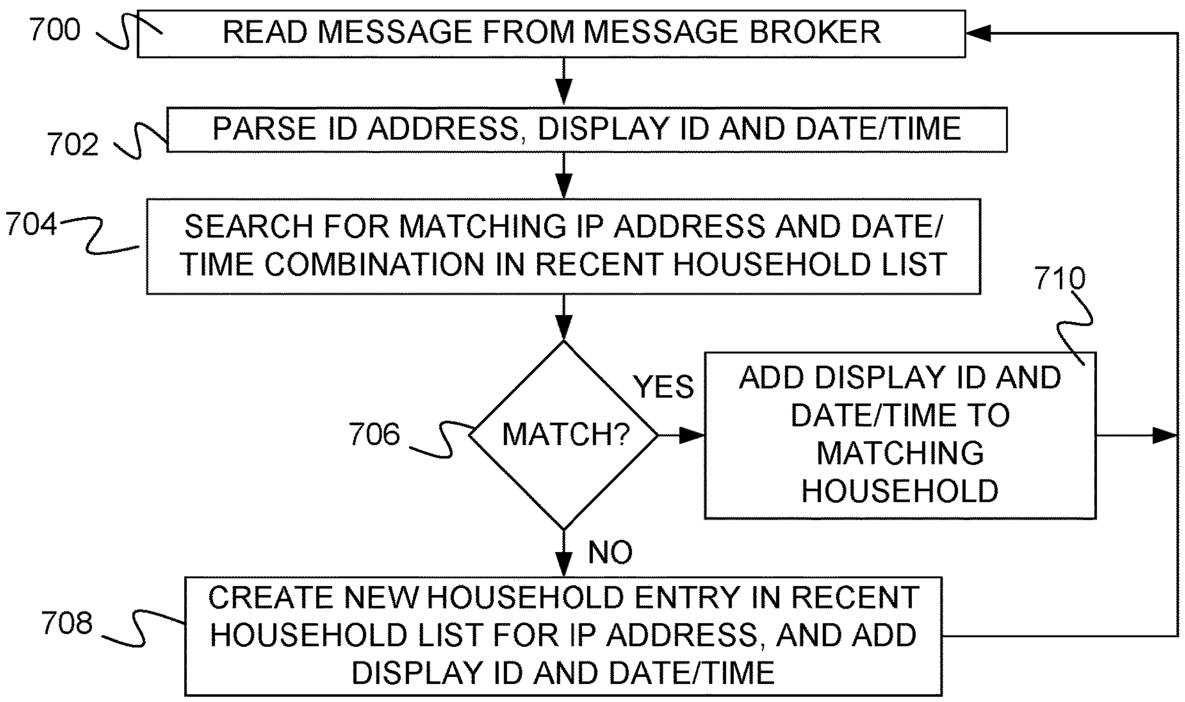
FIG. 7 is a flow diagram of a method of grouping display IDs based on recent viewing records.
Figure 8:
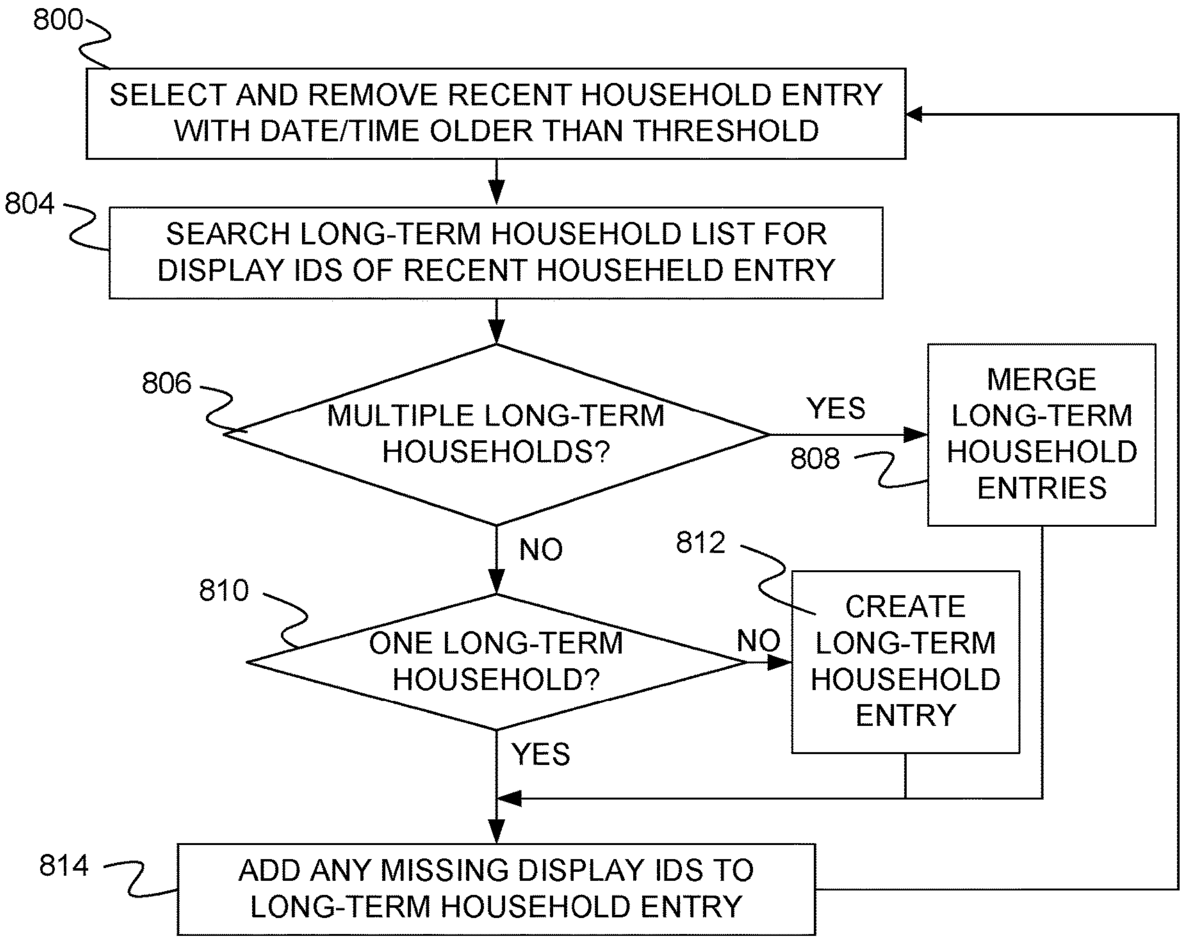
FIG. 8 is a flow diagram of a method of merging recent groupings of display IDs into long-term households.

At step 700 of FIG. 7, household update 600 on server 232 requests and receives a message from message broker 254. Each message received from message broker 254 contains a dynamic IP address, display identifier and date and time of a viewing record 271 in viewing database 250. At step 702, household update 600 parses the IP address, display ID and date and time from the message. At step 704, household update 600 searches a recent household list 602 that contains a separate entry, such as household entry 604, for each unique IP address that is received. Each household entry 604 includes the IP address 606, a list of dates and times 608 provided in messages that included the IP address and a list of display IDs 610 provided in messages that included the IP address.

If none of the household entries 604 contain an IP address that matches the IP address of the current message at step 706, a new household entry is created for the IP address of the message and the date/time of the message and the display ID in the message are written to the household entry at step 708. If a household entry 604 is found with a matching IP address at step 706, the household entry 604 is updated by adding the display ID (if not already in household entry 604) and the date/time from the message.

The entries in recent household list 602 are only maintained for a limited time to avoid becoming corrupted by a change in dynamic IP addresses. If the entries are held too long, it is possible for a dynamic IP address that had been used to one LAN to be reassigned to another LAN and as a result, the display IDs for two different networks would be mistakenly considered to be in the same network. To avoid this, the process of FIG. 8 is used to purge older household entries from recent household list 602 and to update a long-term household list 612 containing household entries, such as household entry 614. Each household entry 613 contains a respective unique household ID 614 and a list of display IDs 616 of all of the display IDs that have been linked together under one or more dynamic IP addresses.

In step 800 of FIG. 8, a recent household entry is selected and removed from recent household list 602 based on a determination that the most recent date/time in the entry is beyond a threshold range from the current date/time. At step 804, the current long-term household entries 614 are searched to determine if any of the long-term household entries contain one of the display IDs of the recent household entry. At step 806, household update 600 determines if more than one long-term household entry contained a display ID of the recent household entry. If more than one long-term household entry is found, the long-term household entries are merged into a single long-term household entry at step 808 by shifting all of the display IDs of the multiple long-term household entries into a single long-term household entry. If multiple long-term household entries are not found at step 806, household update 600 determines if at least one long-term household entry was found during the search of step 804. If a long-term household entry was not found, a new long-term household entry is created at step 812. After steps 808 and 812, or when only a single long-term household entry is found at step 810, the display IDs (if any) in the long-term household entry are compared to the display IDs in the recent household entry and any display IDs in the recent household entry that are not in the long-term household entry are added to the long-term household entry at step 814. After step 814, another recent household entry is selected by returning to step 800.

Figure 9:
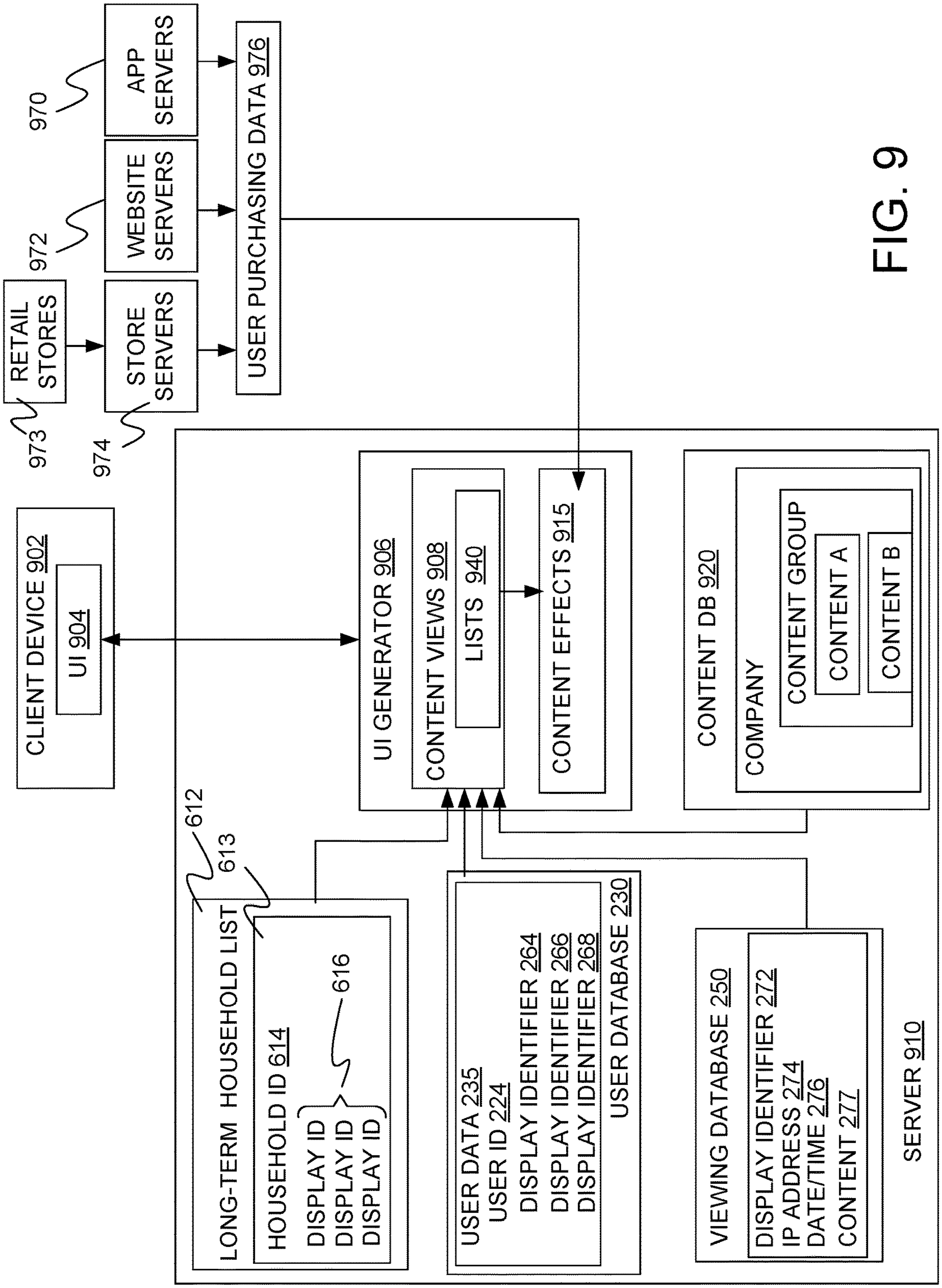
FIG. 9 is a block diagram of elements used to generate a user interface providing metrics based on viewing records.
Figure 10:
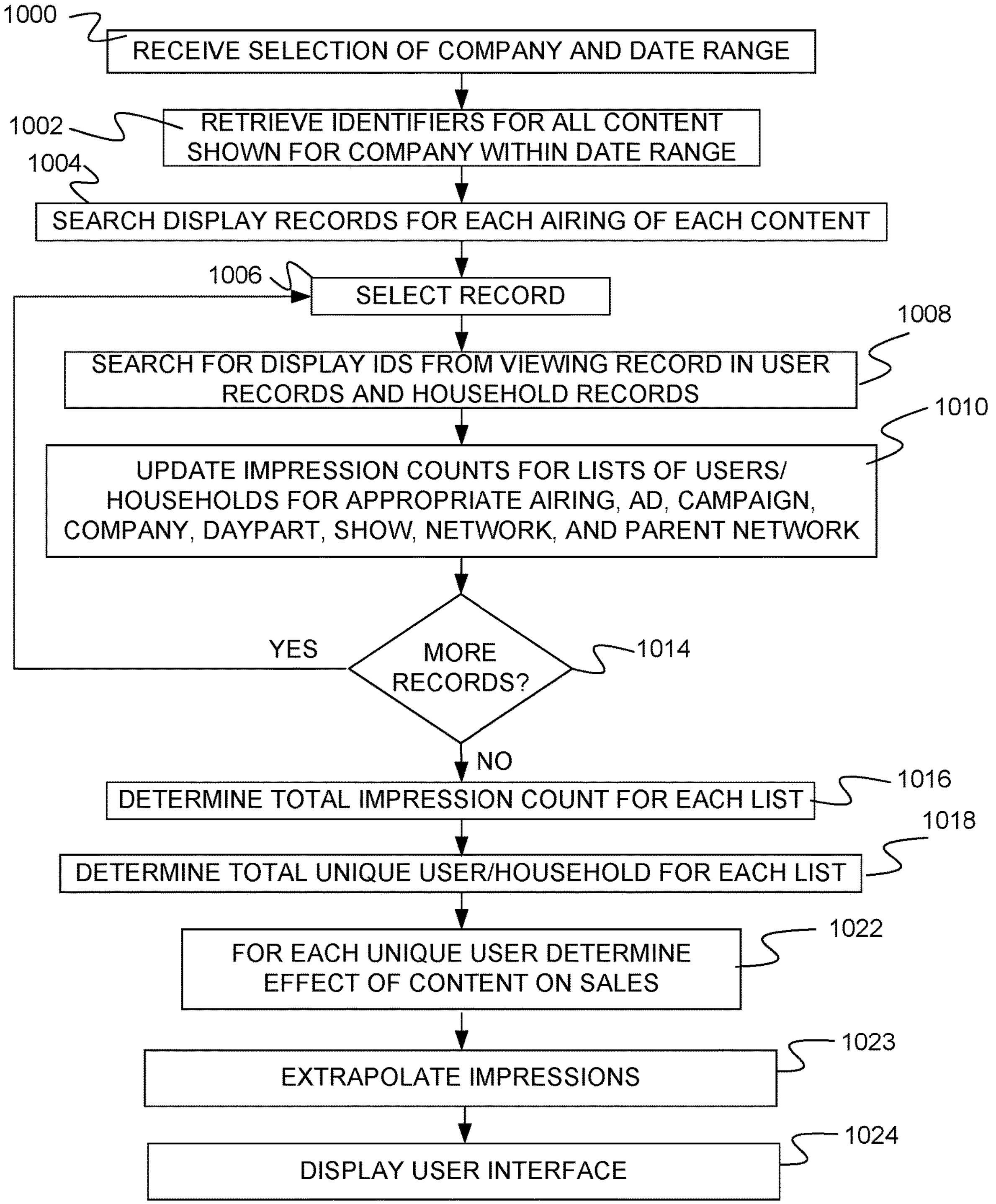
FIG. 10 is flow diagram of a method of generating a user interface providing metrics based on viewing records.

In accordance with one embodiment, user record 235 and long-term household list 612 are used to generate a user interface displaying information about how often content produced by a company was viewed, how many people viewed the content, how many households viewed the content and an average number of times people viewed content from the company. FIG. 9 provides a block diagram of a system 900 used to generate such an interface and FIG. 10 provides a flow diagram of a method for generating such a user interface.

A client device 902 requests an initial version of a user interface from a server 910. In response, a user interface generator 906 on server 910 generates an initial version of a user interface 904 that does not provide viewing information but provides the ability to designate a company and date range. In step 1000 of FIG. 10, client device 902 and user interface 904 are used to submit a company identifier and a date range to user interface generator 906. Upon receiving the company identifier and the date range, user interface generator invokes a content views module 908 to collect viewing information for the company during the date range.

At step 1002, content views module 908 retrieves identifiers for all content that was scheduled to be shown for the company within the date range by performing a search of a content database 920. In accordance with one embodiment, content database 920 contains content records for a plurality of companies, where each record includes an identifier for the content, an identifier for a group of content that the content is part of, and one or more date ranges during which the content is to be shown. The record may include additional metadata about the content such as a name for the content and a temporal length for the content, for example.

At step 1004, content views module 908 searches viewing database 250 for all viewing records that include at least one of the content identifiers retrieved at step 1002 and that have a date that is within the date range provided in step 1000. At step 1006, one of the returned viewing records is selected and at step 1008 content views module 908 searches user database 230 and long-term household list 612 for user records and household records that contain the display identifier 272 of the selected viewing record. At step 1010, content views module 908 updates lists 940 of users and households that are maintained for various groupings of content. Each list includes identifiers of the users and households that viewed content that is within the grouping of content and the number of times each of those users and households viewed content that is within the grouping of content. Examples of possible groupings of content include a single airing of a single piece of content from the company, all airings of the single piece of content from the company, all airings of all content from the company in a defined group of content, all airings of all content from the company, all airings of all content that take place during a particular daypart, all airings of all content from the company that takes place during a show, all airings of all content from the company that takes place during any show on a network, and all airings of all content from the company that takes place during any show on a parent network. Thus, if the display ID of the selected viewing record is found in two user records 235 and one household entry 613, two corresponding user entries and one corresponding household entry will be updated in each list in lists 940. If a user list does not contain a user entry that corresponds to the found user record 235, a user entry for the user will be added to the list. Similarly, if a household list does not contain a household entry that corresponds to the found household entry 613, a household entry for the household will be added to the list. If there are corresponding entries for the user or household, the impression counts in those entries are increased by one.

At step 1014, content views module 908 determines if there are additional viewing records to be processed. When there are additional viewing records to be processed, content views module 908 returns to step 1006 and selects the next viewing record. Steps 1008 and 1010 are then performed for that viewing record. When all of the viewing records have been processed at step 1014, content views module 908 determines a total impression count for each list at step 1016. In particular, a total impression count for users and a total impression count for households is determined for each list. At step 1018, the total number of unique users and the total number of unique households is determined for each list.

At step 1022, an optional content effects module 915 examines user purchasing data 976 to determine the effect of viewing content on purchases. In accordance with one embodiment, user purchasing data 976 is constantly updated based on purchases made by users through one or more app servers 970, one or more website servers 972 and one or more physical retail stores 973. App servers 970 and website servers 972 provide data related to their sales to update user purchasing data 606 while store servers 974 provide data related to sales at physical retail stores 973. Thus, regardless of the purchasing channel utilized by the user, user purchasing data 976 reflects the full purchase history of the user.

In accordance with one embodiment, content effects module 915 identifies users that were motivated to make a purchase based on viewing the content as well as the dollar amount of goods that were purchased by such users.

At step 1023, impressions for all users are extrapolated from the impressions determined for the users in user database 230. In particular, each of the impressions determined in each of the lists is multiplied by the ratio of the total number of people estimated to view content over the number of users in user database 230.

At step 1024, user interface generator 906 updates user interface 904 to include information about the number of impressions for each grouping of content both on a user level and a household level. In accordance with some embodiments, user interface 904 is also updated with purchasing information determined by contents effects module 915.

FIG. 11 provides an example user interface 1100 of user interface 904 showing extrapolated metrics for all airings of various content for a company 1102 over a date range 1104. User interface 1100 includes a list of content 1106, with a separate row of metrics for each content. The metrics include extrapolated impressions 1108, airings 1110, extrapolated impressions per airing 1112, amount spent for the airings 1114, and the cost per one thousand extrapolate impressions (CPM) 1116.

Figure 12:
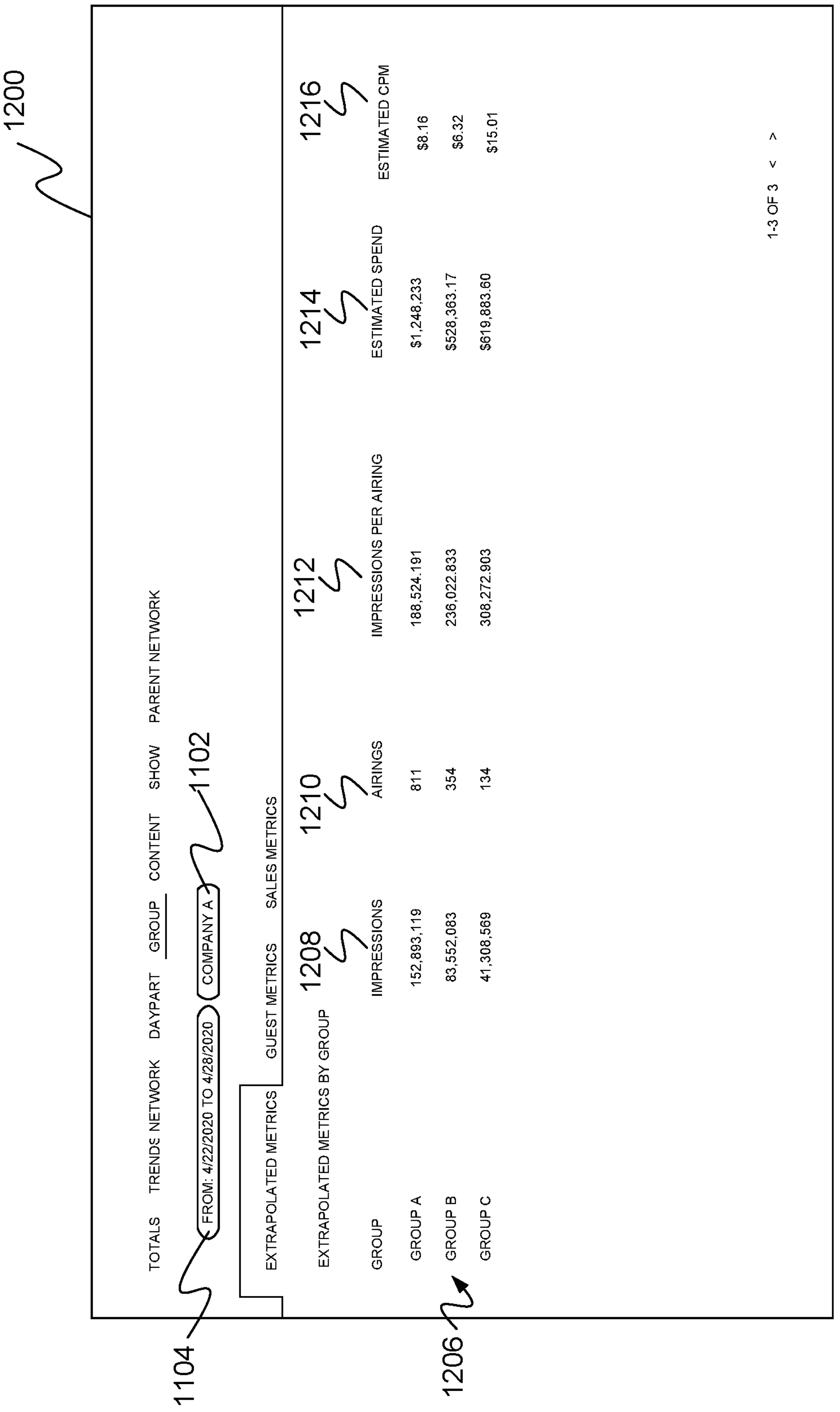
FIG. 12 is an example of a user interface showing extrapolated metrics for groups of content.

FIG. 12 provides an example user interface 1200 of user interface 904 showing extrapolated metrics for all airings of various groups of content for a company 1102 over a date range 1104. User interface 1200 includes a list of groups of content 1206, with a separate row of metrics for each group of content. The metrics include extrapolated impressions 1208, airings 1210, extrapolated impressions per airing 1212, amount spent for the airings 1214, and the cost per one thousand extrapolated impressions (CPM) 1216.

FIG. 13 provides an example user interface 1300 of user interface 904 showing extrapolated metrics for all airings during various dayparts for a company 1102 over a date range 1104. User interface 1300 includes a list of dayparts 1306, with a separate row of metrics for each daypart. The metrics include extrapolated impressions 1308, airings 1310, extrapolated impressions per airing 1312, amount spent for the airings 1314, and the cost per one thousand extrapolated impressions (CPM) 1316.

Figure 14:
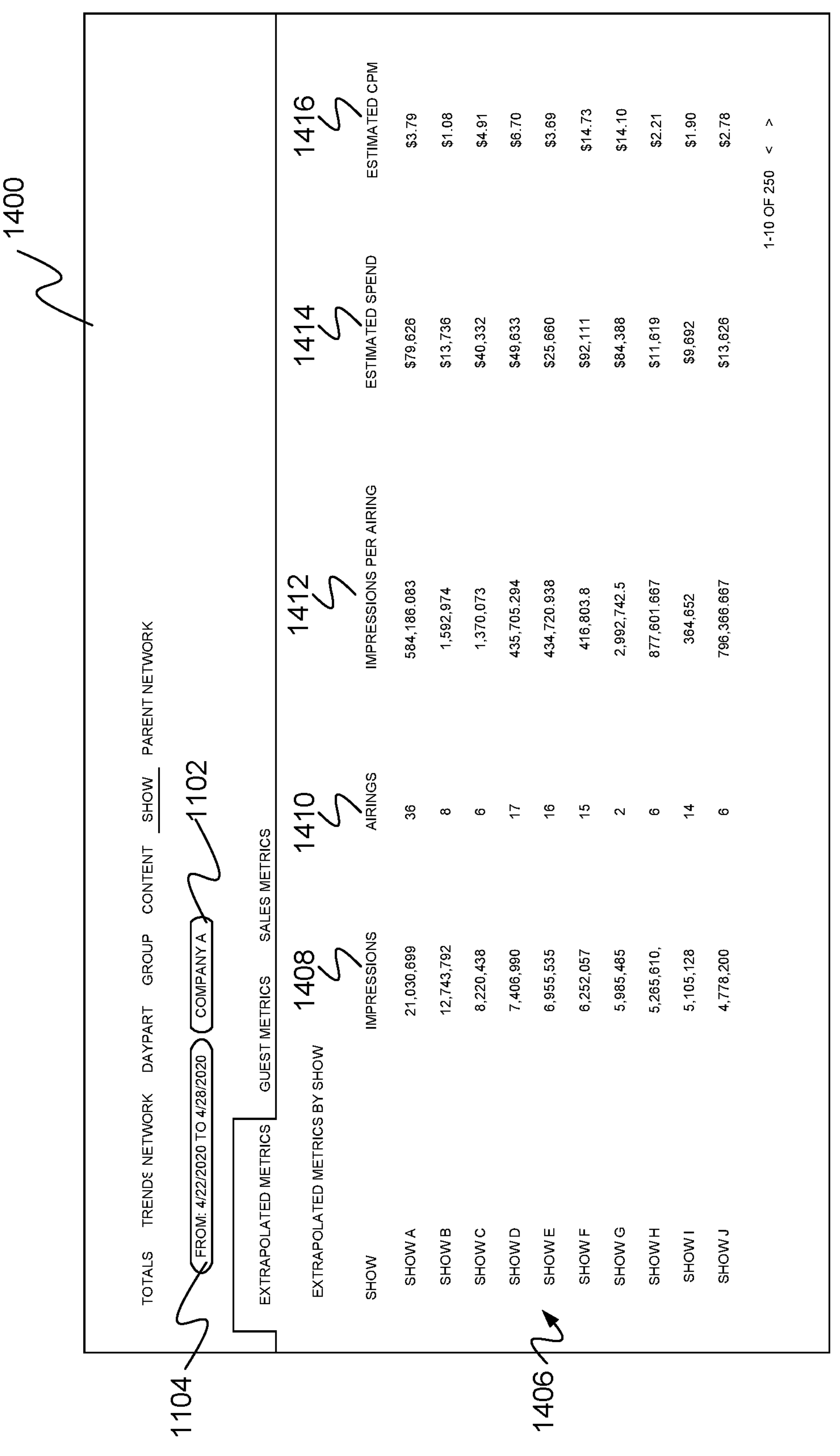
FIG. 14 is an example of a user interface showing extrapolated metrics for shows.

FIG. 14 provides an example user interface 1400 of user interface 904 showing extrapolated metrics for all airings during various shows for a company 1102 over a date range 1104. User interface 1400 includes a list of shows 1406, with a separate row of metrics for each show. The metrics include extrapolated impressions 1408, airings 1410, extrapolated impressions per airing 1412, amount spent for the airings 1414, and the cost per one thousand extrapolated impressions (CPM) 1416.

FIG. 15 provides an example user interface 1500 of user interface 904 showing extrapolated metrics for all airings on various networks for a company 1102 over a date range 1104. User interface 1500 includes a list of networks 1506, with a separate row of metrics for each network. The metrics include extrapolated impressions 1508, airings 1510, extrapolated impressions per airing 1512, amount spent for the airings 1514, and the cost per one thousand extrapolated impressions (CPM) 1516.

Figure 16:
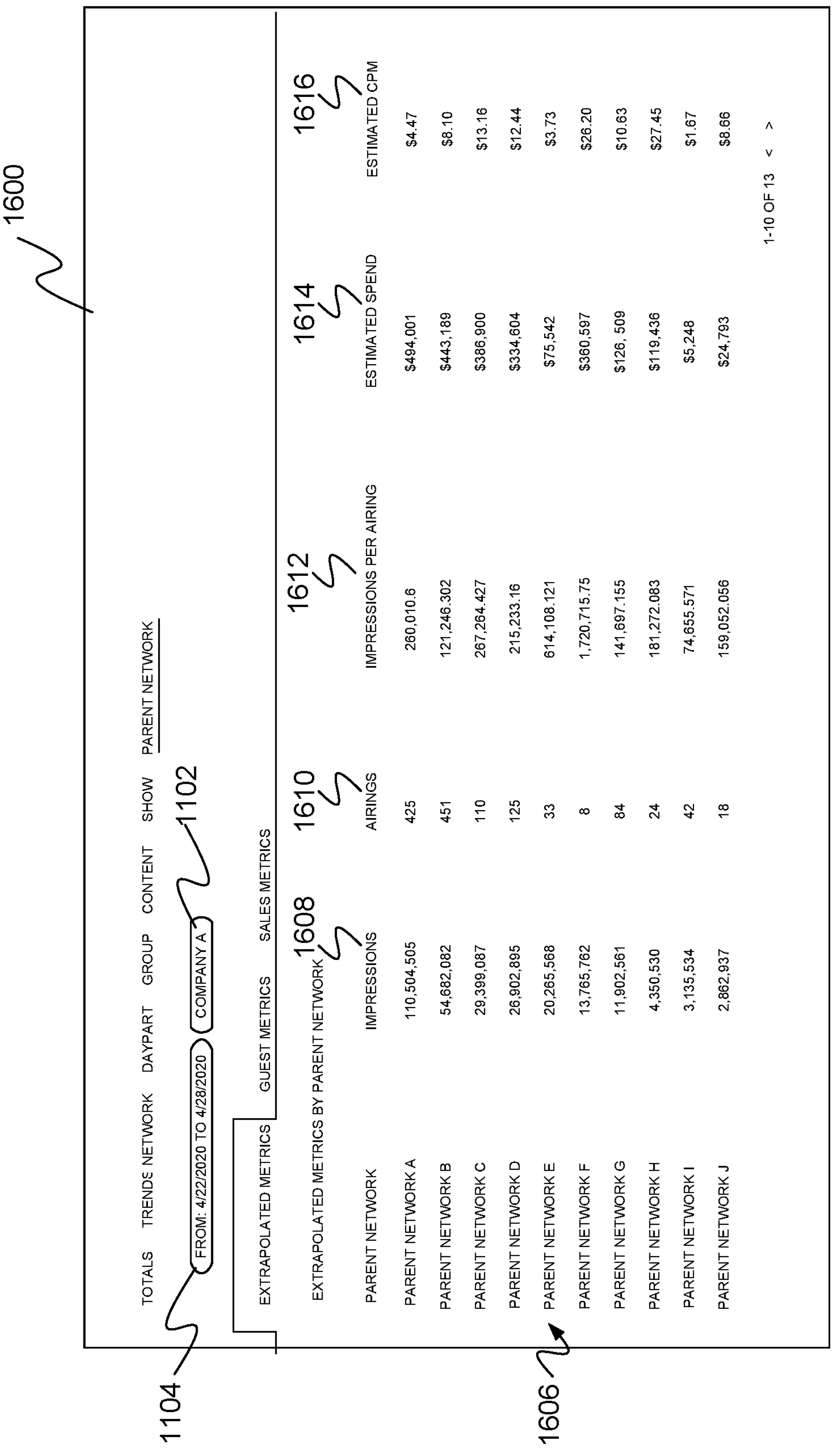
FIG. 16 is an example of a user interface showing extrapolated metrics for parent networks.

FIG. 16 provides an example user interface 1600 of user interface 904 showing extrapolated metrics for all airings on various parent networks for a company 1102 over a date range 1104. User interface 1600 includes a list of parent networks 1606, with a separate row of metrics for each parent network. The metrics include extrapolated impressions 1608, airings 1610, extrapolated impressions per airing 1612, amount spent for the airings 1614, and the cost per one thousand extrapolated impressions (CPM) 1616.

Figure 17:
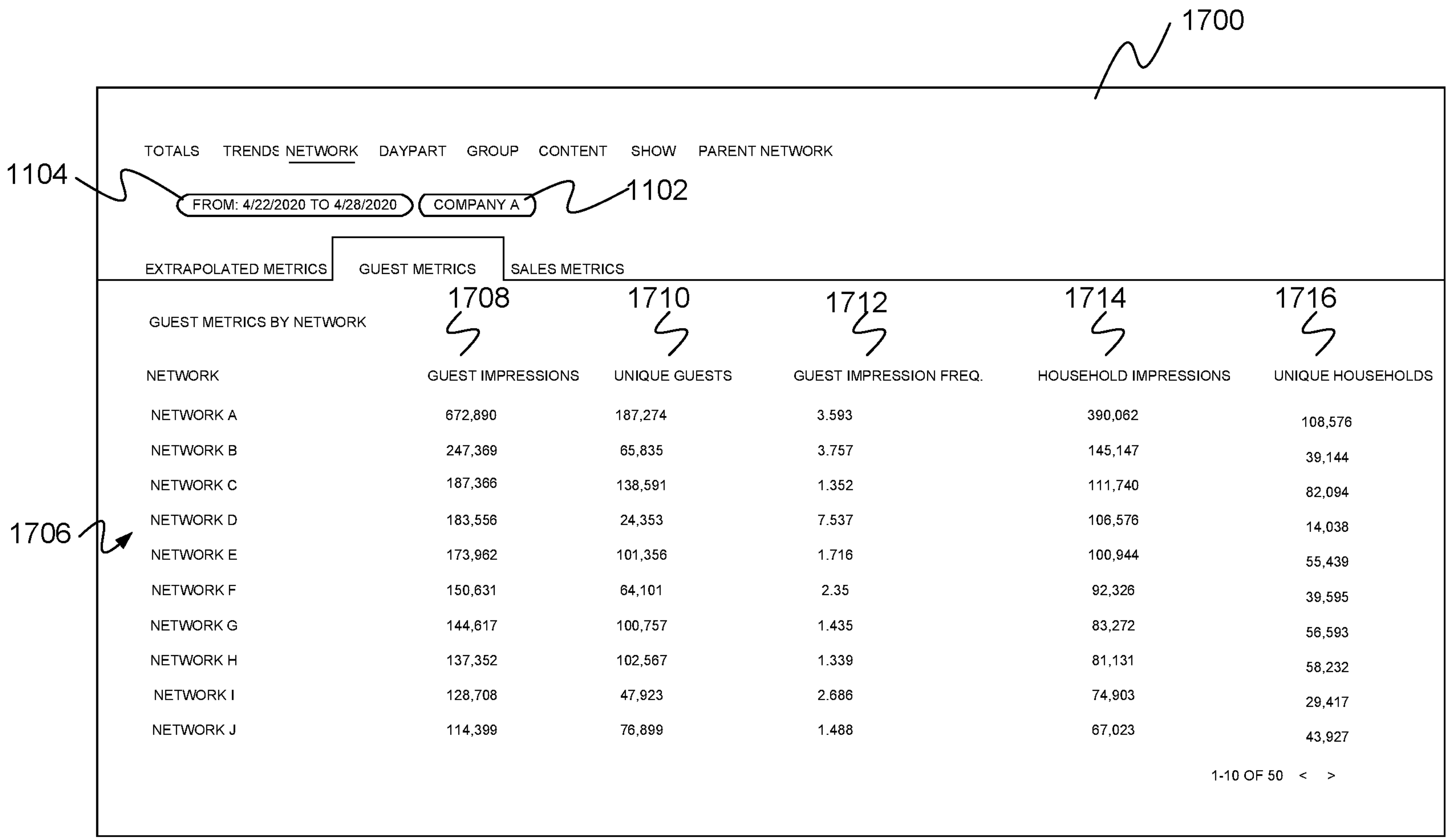
FIG. 17 is an example of a user interface showing guest metrics for networks.

FIG. 17 provides an example user interface 1700 of user interface 904 showing guest metrics for all airings on various networks for a company 1102 over a date range 1104. User interface 1700 includes a list of networks 1706, with a separate row of metrics for each network. The metrics include guest impressions 1708, unique guests 1710, guest impression frequency 1712, household impressions 1714 and unique households 1716. Guest impression frequency 1712 is the number of guest impressions 1708 divided by the number of unique guests 1710 and represents the average number of times each guest has viewed content from company 1102 over date range 1104.

FIG. 18 provides an example user interface 1800 of user interface 904 showing sales metrics associated with all airings on various networks for a company 1102 over a date range 1104. User interface 1800 includes a list of networks 1806, with a separate row of metrics for each network. The metrics include sales 1808, transactions 1810, unique guests 1812, transaction frequency 1814, sales per converted guest 1816, (SPII) 1818, and conversion rate 1820.

Figure 19:
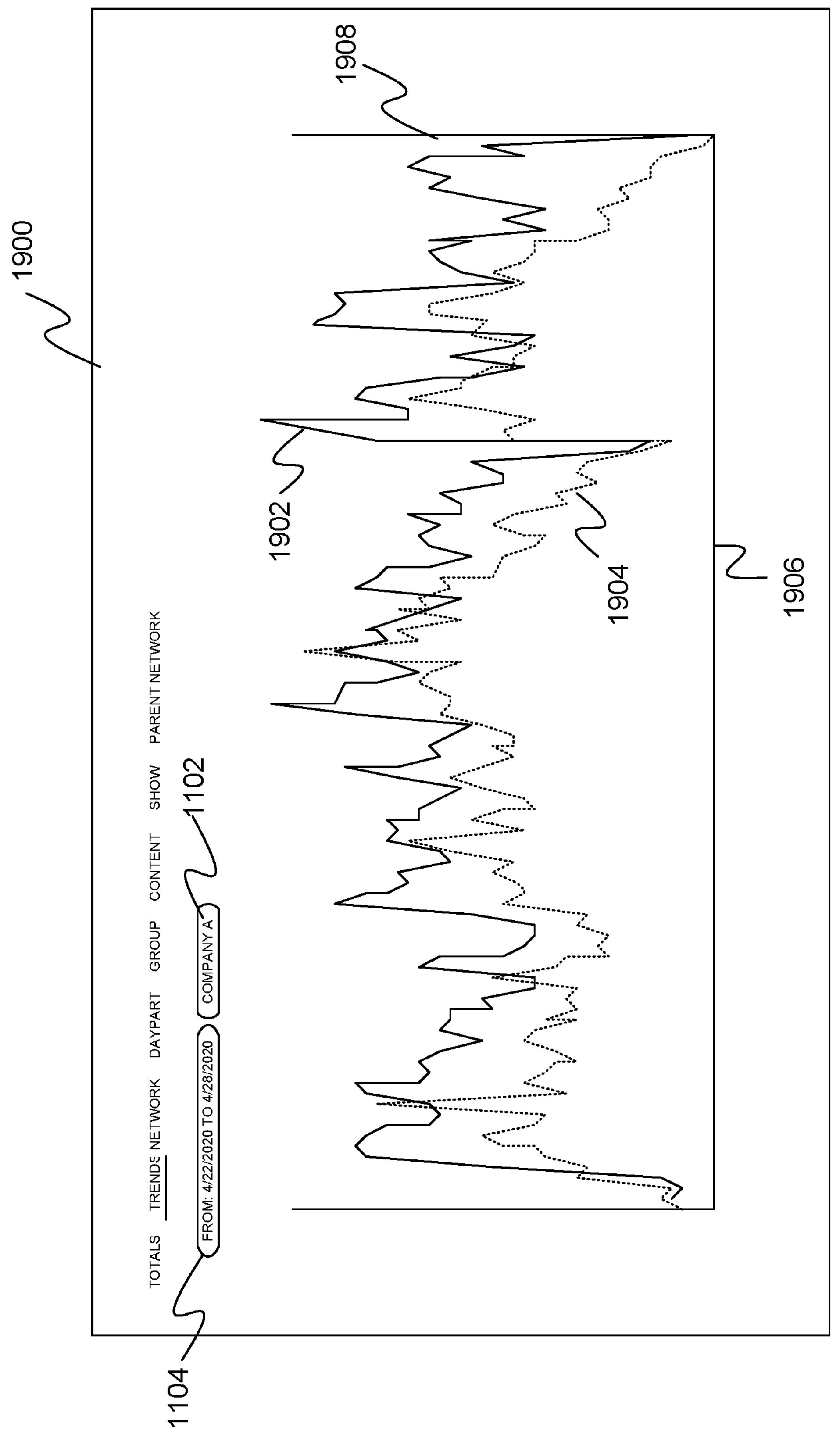
FIG. 19 is an example of a user interface showing trend graphs for a company.

FIG. 19 provides an example user interface 1900 of user interface 904 showing a graph 1902 of airings over dates in date range 1104 and a graph 1904 of sales over dates in date range 1104 for company 1102. In FIG. 19, dates are shown along horizontal axis 1906 and airings and sales are shown along vertical axis 1908.

Figure 20:
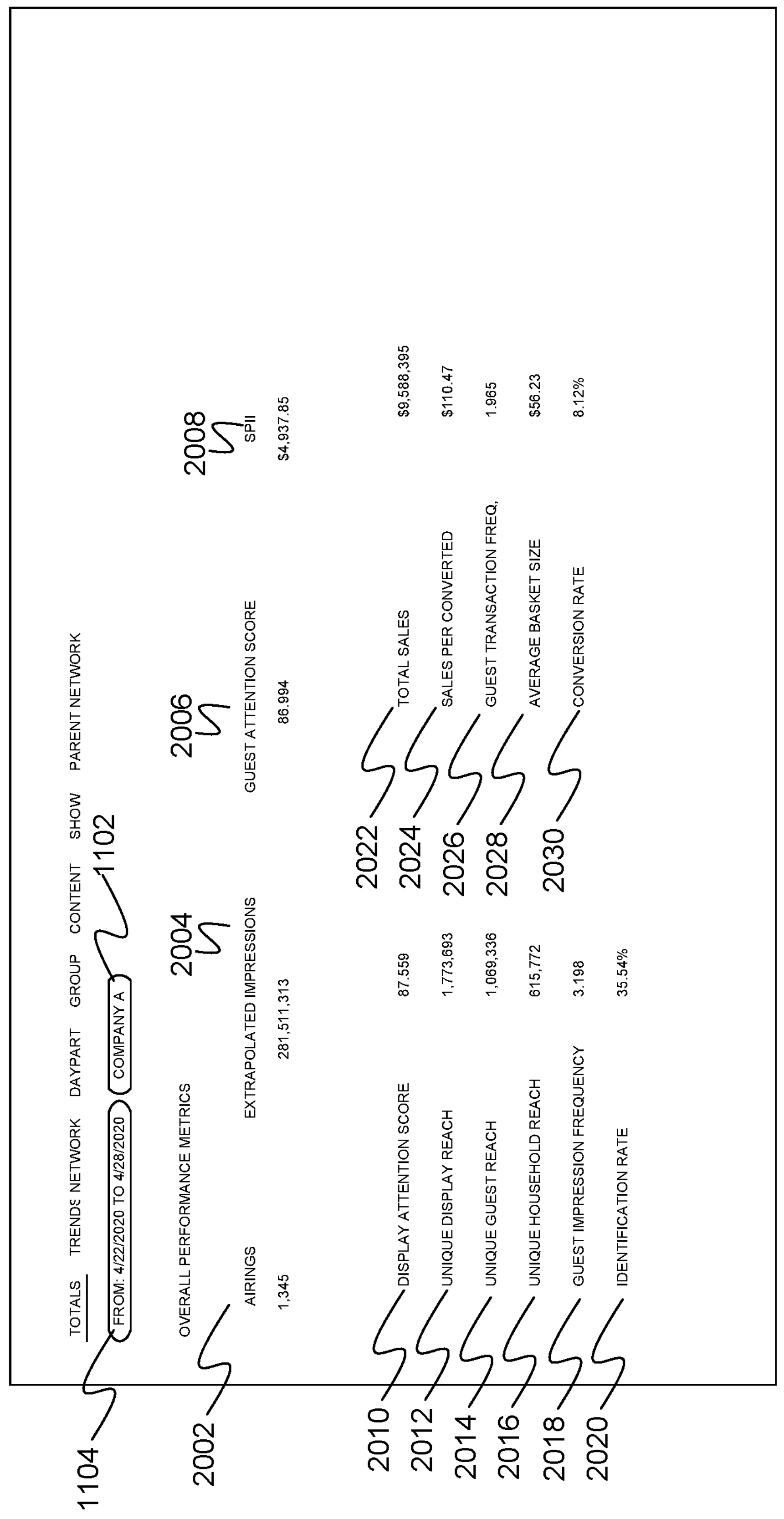
FIG. 20 is an example of a user interface showing total metrics for a company.

FIG. 20 provides an example user interface 2000 of user interface 904 showing company metrics for all airings of all content for company 1102 during date range 1104. The company metrics include airings 2002, extrapolated impressions 2004, guest attention score 2006, SPII 2008, display attention score 2010, unique display reach 2012, unique guest reach 2014, unique household reach 2016, guest impression frequency 2018, identification rate 2020, total sales 2022, sales per converted 2024, guest transaction frequency 2026, average basket size 2028, and conversion rate 2030.

Figure 21:
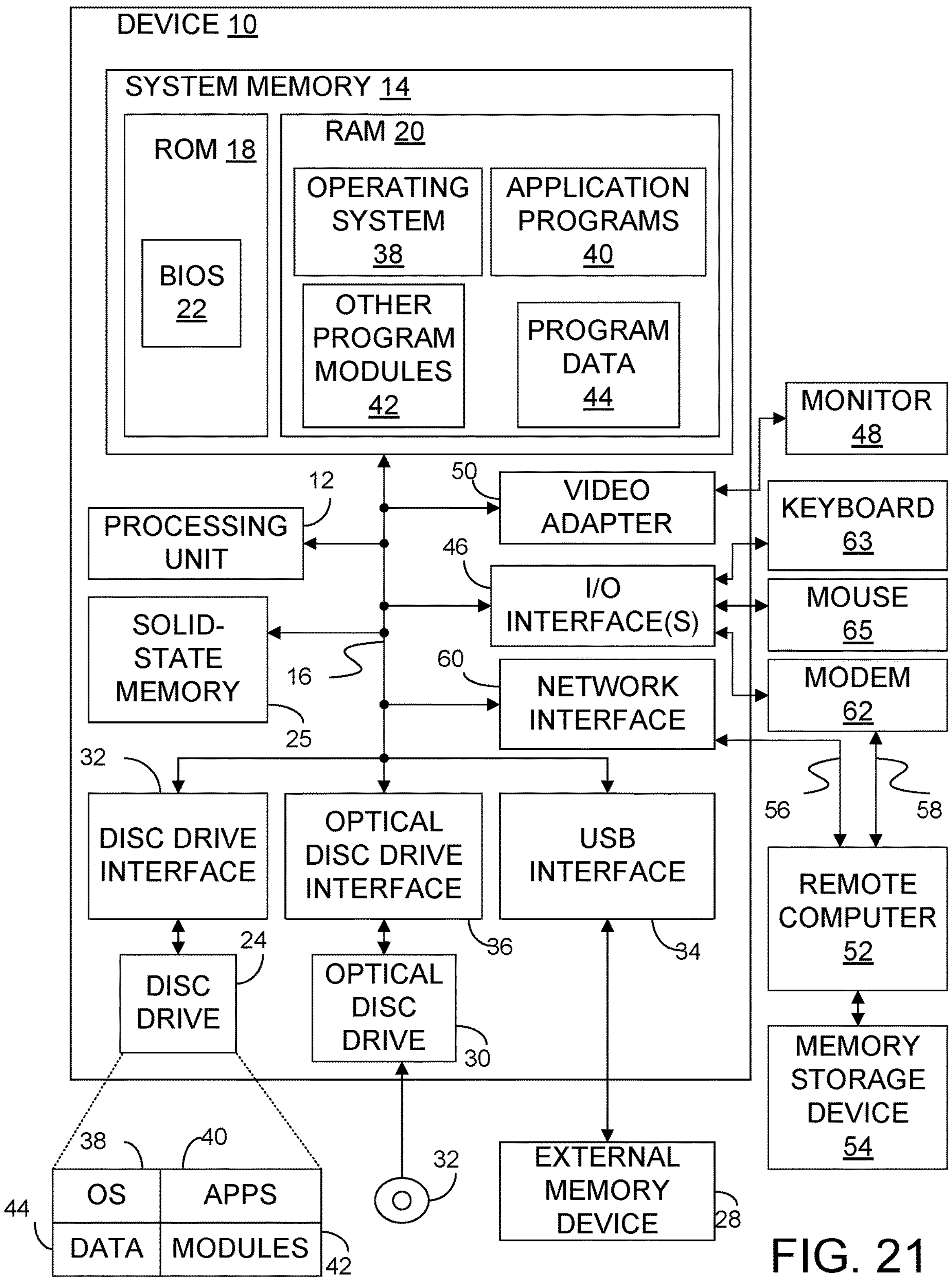
FIG. 21 is a block diagram of a computer system in accordance with one embodiment.

FIG. 21 provides an example of a computing device 10 that can be used as a server or client device in the embodiments above. Computing device 10 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 21. The network connections depicted in FIG. 21 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 21 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:

receiving an internet protocol address and an identifier for a first display and storing the first display's internet protocol address and the first display's identifier in a first viewing record;

receiving an internet protocol address and an identifier for a second display and storing the second display's internet protocol address and the second display's identifier in a second viewing record;

receiving a device's internet protocol address and a user identifier for a request sent by the device to a server;

determining that the first display's internet protocol address matches the device's internet protocol address and in response associating the first display's identifier with the user identifier;

using the first display's identifier in a third viewing record and the association between the first display's identifier and the user identifier to determine that content listed in the third viewing record was viewed by a user represented by the user identifier;

retrieving the first viewing record, determining that the first internet protocol address is not present in a list of recent households and in response creating an entry in the list of recent households that includes the first internet protocol address and the first display's identifier;

retrieving the second viewing record, determining that the second internet protocol address matches the first internet protocol address in the entry in the list of recent households and in response adding the second display's identifier to the entry;

determining that a difference in time between a current date and time and a date and time in the entry exceeds a threshold and in response, reducing corruption of data by:

searching entries in a list of long-term household entries for the first display's identifier and the second display's identifier;

finding a first entry in the list of long-term household entries that includes the first display's identifier and a second entry in the list of long-term household entries that includes the second display's identifier;

merging the first entry and the second entry to indicate that the first display identifier and the second display identifier are in a single household in the list of long-term household entries; and removing the entry from the list of recent households.

2. The computer-implemented method of claim 1 wherein determining that the first display's internet protocol address matches the device's internet protocol address comprises determining that a date and time when the first display's internet protocol address was received is within a window of a date and time when the device's internet protocol address was received.

3. The computer-implemented method of claim 1 further comprising determining that the internet protocol address for the second display matches the device's internet protocol address and in response associating the second display's identifier with the user identifier.

4. The computer-implemented method of claim 1 wherein the third viewing record further comprises a second internet protocol address for the display that is different from the device's internet protocol address.

5. The computer-implemented method of claim 1 further comprising:

receiving a second device's internet protocol address and a second user identifier for a second request sent by the second device to the server;

determining that the first display's internet protocol address matches the second device's internet protocol address and in response associating the first display's identifier with the second user identifier; and using a display identifier in a fourth viewing record and the association between the first display's identifier and the second user identifier to determine that content listed in the fourth viewing record was viewed by a second user represented by the second user identifier.

6. The computer-implemented method of claim 1 further comprising determining purchases made by the user after the user viewed the content.

7. The computer-implemented method of claim 6 wherein the purchases are made in a physical store.

8. A computer server comprising:

a memory containing instructions;

a processor executing the instructions to perform steps comprising:

receiving a first display identifier and a first internet protocol address associated with a first display;

creating a recent household entry for the first display identifier and first internet protocol address;

receiving a second display identifier for a second display, the first internet protocol address and a timestamp;

adding the second display identifier and the timestamp to the recent household entry;

reducing data corruption by:

determining that the timestamp precedes a current time by more than a threshold and in response:

searching entries in a list of long-term household entries for the first display identifier and the second display identifier;

finding a first entry in the list of long-term household entries that includes the first display identifier and a second entry in the list of long-term household entries that includes the second display identifier;

merging the first entry and the second entry to indicate that the first display identifier and the second display identifier are in a single household in the list of long-term household entries; and removing the recent household entry;

receiving the first display identifier in a message indicating the first display displayed content, the first display identifier being distinct from an internet protocol address;

searching a database to locate a user identifier for the first display identifier; and associating the user identifier with the content.

9. The computer server of claim 8 wherein the processor executes further steps comprising:

searching a database to locate a purchase associated with the user identifier; and associating the purchase with the content.

10. The computer server of claim 9 wherein the purchase is a purchase made at a physical store.

11. The computer server of claim 8 wherein the processor executes further steps comprising:

receiving an internet protocol address associated with the first display and the first display identifier;

receiving an internet protocol address associated with a device; and using the internet protocol address associated with the first display and the internet protocol address associated with the device to create a record that associates the first display identifier with the user identifier.

12. The computer server of claim 11 wherein using the internet protocol address associated with the first display and the internet protocol address associated with the device to create the record comprises comparing a date when the internet protocol address associated with the first display was provided to a date when the internet protocol address associated with the device was provided.

13. The computer server of claim 11 wherein using the internet protocol address associated with the first display and the internet protocol address associated with the device comprises determining that at least a portion of the internet protocol address associated with the first display matches at least a portion of the internet protocol address associated with the device.

14. The computer server of claim 8 wherein the processor executes further steps comprising:

displaying an identifier for the content; and displaying an indication of how many user identifiers viewed the content.

15. A method comprising:

receiving a first display identifier and a first internet protocol address associated with a first display;

creating a recent household entry for the first display identifier and first internet protocol address;

receiving a second display identifier for a second display, the first internet protocol address and a timestamp;

adding the second display identifier and the timestamp to the recent household entry;

reducing data corruption by:

determining that the timestamp precedes a current time by more than a threshold and in response:

searching entries in a list of long-term household entries for the first display identifier and the second display identifier;

finding a first entry in the list of long-term household entries that includes the first display identifier and a second entry in the list of long-term household entries that includes the second display identifier;

merging the first entry and the second entry to indicate that the first display identifier and the second display identifier are in a single household in the list of long-term household entries; and removing the recent household entry;

linking a user identifier to the first display identifier using a dynamic internet protocol address, wherein neither the user identifier nor the first display identifier are internet protocol addresses;

using the first display identifier to determine that selected content was viewed on the first display;

using the linking of the user identifier to the first display identifier to determine that a user associated with the user identifier viewed the selected content; and displaying a measure of how many users viewed the selected content based in part on the determination that the user associated with the user identifier viewed the selected content.

16. The method of claim 15 wherein the dynamic internet protocol address is associated with a device that is associated with the user identifier and linking the user identifier to the first display identifier comprises comparing the dynamic internet protocol address to a dynamic internet protocol address associated with the first display.

17. The method of claim 16 wherein linking the user identifier to the first display identifier further comprises comparing a date and time for the dynamic internet protocol associated with the device to a date and time for the dynamic internet protocol address associated with the first display.

18. The method of claim 16 wherein using the linking of the user identifier to the first display identifier to determine that a user associated with the user identifier viewed the selected content comprises using the linking after the dynamic internet protocol address associated with the first display has changed.

19. The method of claim 16 wherein using the linking of the user identifier to the display identifier to determine that a user associated with the user identifier viewed the selected content comprises using the linking after the dynamic internet protocol address associated with the device has changed.

20. The method of claim 15 wherein displaying a measure of how many users viewed the selected content comprises displaying a measure of changes in purchases of users who viewed the selected content.

* * * * *